US008071209B2

(12) United States Patent
Theberge et al.

(10) Patent No.: US 8,071,209 B2
(45) Date of Patent: Dec. 6, 2011

(54) WAX BLENDS FOR USE WITH ENGINEERED WOOD COMPOSITES

(75) Inventors: Jean-Pascal Theberge, Jefferson, GA (US); Winford Terry Liles, Jefferson, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 0 days.

(21) Appl. No.: 12/757,578

(22) Filed: Apr. 9, 2010

(65) Prior Publication Data

US 2011/0251306 A1 Oct. 13, 2011

(51) Int. Cl.
*B32B 5/66* (2006.01)

(52) U.S. Cl. ........ 428/323; 428/326; 428/327; 428/402; 428/407; 264/109

(58) Field of Classification Search .................. 428/323, 428/326, 327, 402, 407; 264/109
See application file for complete search history.

(56) References Cited

U.S. PATENT DOCUMENTS 2,402,554 A 6/1946 Irvine et al.
5,607,633 A 3/1997 Sleeter et al.
5,942,058 A 8/1999 Sleeter et al.
6,001,286 A 12/1999 Sleeter
6,183,849 B1 2/2001 Lindsay et al.
6,231,656 B1 5/2001 Dekerf et al.
6,277,310 B1 8/2001 Sleeter
6,335,058 B1 1/2002 Symons
6,908,677 B2 6/2005 Shoshany et al.
7,563,826 B2 7/2009 Wantling et al.
7,736,559 B2 * 6/2010 Rivers et al. .................. 264/109
2003/0165669 A1 9/2003 Nowak et al.
2004/0013857 A1 1/2004 Winterowd et al.
2004/0035517 A1 2/2004 Vijayendran et al.
2005/0269728 A1 12/2005 Roos
2007/0181035 A1 8/2007 Wantling et al.
2008/0207774 A1 8/2008 Krishnan
2008/0220267 A1 9/2008 Howell et al.
2009/0220443 A1 9/2009 Braksmayer et al.
2010/0024281 A1 2/2010 Lemke et al.
2010/0116406 A1 5/2010 Mahoney et al.
2010/0186627 A1 7/2010 Wantling et al.

FOREIGN PATENT DOCUMENTS

EP 990680 4/2000
WO 2009062312 5/2009

OTHER PUBLICATIONS

Hsu et al: "The effect of wax type and content on waferboard properties" International Prticleboard/Composite Materials Symposium, Apr. 3-5, 1990, pp. 85-93.*
Hsu et al: "The effect of wax type and content on wafeboard properties" International Particleboard /Composite Materials Symposium, Apr. 3-5, 1990, pp. 85-93.*
Hsu, W. Ernest; Melanson, R.J.; and Kozak, Peter J., "The Effect of Wax Type and Content on Waferboard Properties", International Particleboard/Composite Materials Symposium, Apr. 3-5, 1990, pp. 85-93.
Rodriguez-Valverde, M.A.; Tejera-Garcia, R.; Cabrerizo-Vilchez M.A.; Hidalgo-Alvarez, R.; Nolla-Anguera, J.; Esquena-Moret, J.; Solans-Marsa, C.; Mujika-Garai, R.; Aguilar-Garcia, F.; Juárez Arroyo, F.; Covián-Sánchez, I.; "Influence of Oil Content in Paraffins on the Behavior of Wax Emulsions: Wetting and Rheology", Journal of Dispersion Science and Technology, 1532-2351, vol. 27, Issue 2, 2006, pp. 155-163.

* cited by examiner

*Primary Examiner* — Leszek Kiliman
(74) *Attorney, Agent, or Firm* — Gardner Groff Greenwald & Villanueva, PC

(57) ABSTRACT

Wax is a key ingredient in engineered wood composites, such as oriented strand board (OSB) and oriented strand lumber (OSL), to prevent and reduce swelling caused by water uptake. Wax, normally a byproduct of oil refining and lube production, is now considered a precious feedstock for producing higher margin product such as fuel or diesel. Disclosed herein are suitable alternative waxes to petroleum wax for use as sizing agents in producing engineered wood composites.

19 Claims, 28 Drawing Sheets

FIG. 18
Boxplot of WA
11.5
11.0
10.5
10.0
9.5
9.0
8.5
8.0
WA
DC600 (Soy wax)
Slack

WAX BLENDS FOR USE WITH ENGINEERED WOOD COMPOSITES

BACKGROUND

Wax is a key ingredient in engineered wood composites, such as oriented strand board (OSB) and oriented strand lumber (OSL), to reduce swelling caused by water uptake. Over the years, the North American production of wax has been steadily declining and is predicted to drop further in the future. It is believed that twenty-five percent of the North American wax capacity is in jeopardy. Wax, normally a byproduct of oil refining and lube production, is now considered a precious feedstock for producing higher margin product such as gasoline or diesel. With a tight supply and mounting pressure from crude oil price, wax prices have approached unseen levels in the last two years. OSB and other wood composite manufacturers are facing several challenges from a supply position. The future of wax supply is uncertain, and the pressure on wax pricing will likely remain high. OSB and other wood composite manufacturers currently use semi-refined wax (slack) and emulsion wax products. Thus, suitable waxes are needed as alternatives to petroleum wax for use as sizing agents in producing engineered wood products.

SUMMARY

Generally described, the present invention relates to sizing agent compositions for use in producing engineered wood composites. For example, disclosed is an engineered wood composite comprising at least one layer of wood flakes, wherein the wood flakes are bonded together by a binder resin and sized by a sizing agent, wherein the sizing agent comprises an effective blend of an effective ratio of a petroleum slack wax and a biowax, and wherein the petroleum slack wax has a melting point less than about 77° C. (170° F.), an oil content of about 5 wt % to about 30 wt %, and a flash point less than 316° C. (600° F.). Also disclosed is an article comprising the herein disclosed engineered wood composite.

Additionally is a sizing agent composition comprising a blend of a petroleum slack wax and a biowax, wherein the petroleum slack wax has a melting point less than 77° C. (170° F.), an oil content of about 5% to about 30%, and a flash point less than 316° C. (600° F.).

Further disclosed is a method of manufacturing an engineered wood composite comprising coating a plurality of wood flakes with a binder resin and a sizing agent, wherein the sizing agent comprises a blend of a petroleum slack wax and a biowax and wherein the petroleum slack wax has a melting point less than 77° C. (170° F.), an oil content of about 5% to about 30%, and a flash point less than 316° C. (600° F.); assembling the coated flakes into a mat; and curing the coated flakes in the mat to form the engineered wood composite.

Additional aspects of the disclosed composition(s) and method(s) will be set forth in part in the description which follows, and in part will be understood from the description, or may be learned by practice of the disclosed composition(s) and method(s). The advantages of the disclosed composition(s) and method(s) will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed methods and compositions and together with the description, serve to explain the principles of the disclosed methods and compositions.

DETAILED DESCRIPTION

Figure 1:
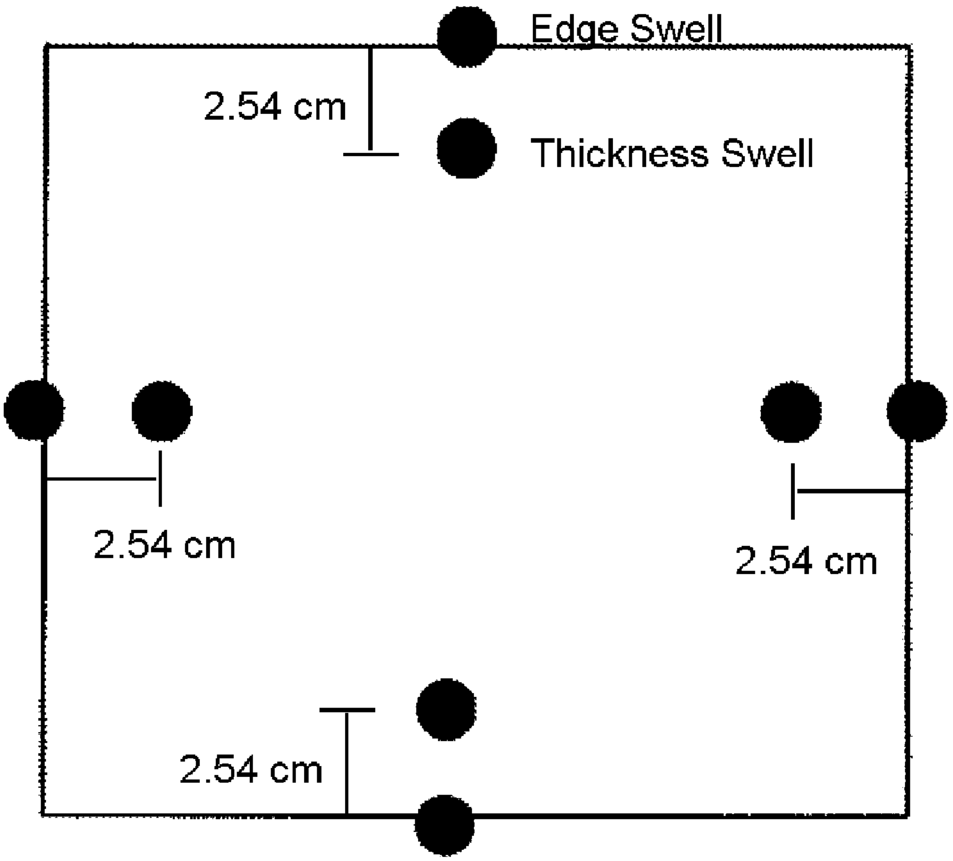
FIG. 1 illustrates a pictorial diagram showing where to measure edge swell and thickness swell in accordance with an example embodiment of the present invention.

The disclosed methods and compositions may be understood more readily by reference to the following detailed description of particular embodiments and the Examples included therein and to the Figures and their previous and following description.

Before the present compounds, compositions, and/or methods are disclosed and described, it is to be understood that the aspects described below are not limited to specific compositions, methods, or uses, as such may, of course, vary. It is also to be understood that the terminology used herein is for the purpose of describing particular aspects only and is not intended to be limiting.

Disclosed are materials, compositions, and components that can be used for, can be used in conjunction with, can be used in preparation for, or are products of the disclosed composition(s) and method(s). These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein. Thus, if a class of waxes A, B, and C is disclosed as well as a class of waxes D, E, and F and an example of a combination wax, A-D is disclosed, then even if each is not individually recited, each is individually and collectively contemplated. Thus, in this example, each of the combinations A-E, A-F, B-D, B-E, B-F, C-D, C-E, and C-F is specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this application including, but not limited to, steps in methods of making and using the disclosed compositions. Thus, if there are a variety of additional steps that can be performed, it is understood that each of these additional steps can be performed with any specific embodiment or combination of embodiments of the disclosed methods, and that each such combination is specifically contemplated and should be considered disclosed.

Concentrations, amounts, and other numerical data may be expressed or presented herein in a range format. It is to be understood that such a range format is used merely for convenience and brevity and, thus, should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Those skilled in the art will recognize, or be able to ascertain using no more than routine experimentation, equivalents to the specific embodiments of the composition(s) and method(s) described herein. Such equivalents are intended to be encompassed by the appended claims.

It is understood that the disclosed composition(s) and method(s) are not limited to the particular methodology, protocols, and reagents described as these may vary. It is also to be understood that the terminology used herein is for the purpose of describing particular embodiments only and is not intended to limit the scope of the present invention which will be limited only by the appended claims.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Unless defined otherwise, all technical and scientific terms used herein have the same meanings as commonly understood by one of skill in the art to which the disclosed methods and compositions belong. Although any methods and materials similar or equivalent to those described herein can be used in the practice or testing of the present method and compositions, the particularly useful methods, devices, and materials are as described. Publications cited herein and the material for which they are cited are hereby specifically incorporated by reference. Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinency of the cited documents.

It must be noted that as used herein and in the appended claims, the singular forms "a," "an," and "the" include plural referents unless the context clearly dictates otherwise. Thus, for example, reference to "a wax" includes a plurality of such waxes, reference to "the wax" is a reference to one or more waxes and equivalents thereof known to those skilled in the art, and so forth.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that the throughout the application, data are provided in a number of different formats, and that these data represent endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units is also disclosed. For example, if 10 and 15 are disclosed, then 11, 12, 13, and 14 are also disclosed.

In this specification and in the claims that follow, reference will be made to a number of terms that shall be defined to have the following meanings:

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to" and is not intended to exclude, for example, other additives, components, integers or steps.

Compositions

Disclosed herein is a sizing agent for use in the production of engineered wood composites. Such engineered wood composites can include, but are not limited to, oriented strand board (OSB), particle board, plywood, waferboard, chipboard, medium-density fiberboard, parallel strand lumber, oriented strand lumber (OSL), and laminated strand lumber. OSB and other engineered wood composite manufacturers currently use semi-refined wax (slack) and emulsion wax products from petroleum sources as a sizing agent. However, there is a need for alternative sources of wax, such as bio-based waxes, to replace at least a portion of petroleum wax in the production of engineered wood composites.

In some aspects, the sizing agent disclosed herein can comprise a blend of petroleum wax and a bio-based wax (biowax). In some aspects, the biowax and petroleum wax are blended at a weight ratio of about 20:80 to about 80:20. Thus, in some aspects, the biowax and petroleum wax are blended at a weight ratio of about 20:80, 25:75, 30:70, 35:65, 40:60, 45:55, 50:50, 55:45, 60:40, 65:35, 70:30, 75:25, or 80:20, including all ratios in between.

The term "biowax" as used herein is any wax derived from animals or plants. For example, the biowax is any wax substantially produced from lipids derived from an animal or a plant. Thus, the biowax can be produced from the fat of an animal. The animal may be any vertebrate comprising fat, including livestock or fish.

In some aspects, the biowax is tallow or is produced from tallow. Thus, the biowax can be a hydrogenated form of tallow. Tallow is a generally rendered form of beef or mutton fat, processed from suet. It is solid at room temperature. Unlike suet, tallow can be stored for extended periods without the need for refrigeration to prevent decomposition, provided it is kept in an airtight container to prevent oxidation. While rendered fat obtained from pigs is generally known as lard, tallow is not strictly defined as beef or mutton fat. As disclosed herein, "tallow" is animal fat that conforms to certain technical criteria, including its melting point, which is also known as titre. Thus, it is common for commercial tallow to contain fat derived from other animals, such as pigs or even from plant sources.

Alternatively or additionally, the biowax can comprise vegetable wax. Thus, the biowax can be produced from vegetable fat or hydrogenated vegetable oil. The vegetable fat or oil can come from any plant or vegetable. Thus, in some aspects, the biowax is produced from soy stearine, stearine, corn, cottonseed, rape, canola, sunflower, palm, palm kernel, coconut, crambe, peanut, or tall oil. Thus, in some aspects, the biowax is produced from soybean or hydrogenated castor oil. Thus, in some aspects, the biowax comprises hydrogenated soybean or hydrogenated castor oil.

When a hydrogenated vegetable oil is used, the hydrogenation process involves "sparging" the oil at high temperature and pressure with hydrogen in the presence of a catalyst, typically a powdered nickel compound. As each double-bond is broken, two hydrogen atoms each form single bonds with the two carbon atoms. The elimination of double-bonds by adding hydrogen atoms is called saturation; as the degree of saturation increases, the oil progresses towards being fully hydrogenated. As the degree of saturation increases, the oil's viscosity and melting point increase. As used herein, "hydrogenated" refers to any level of hydrogenation and is, therefore, meant to include partially-hydrogenated oils. The degree of hydrogenation will vary on the feedstock used to achieve the desired melt point disclosed herein.

The sizing agents disclosed herein include a petroleum wax. The term "petroleum wax" as defined herein is any petroleum wax suitable for use as a sizing agent for engineered wood composites. In one aspect, the petroleum wax is a petroleum slack wax. A slack wax is a semi-refined wax, distinguished from scale wax by having generally a higher oil content. Semi-refined slack waxes can have oil contents up to 30 mass percent. Slack waxes with less than 10 wt % oil content are considered more refined waxes and are used in the manufacture of different items such candles, corrugating, packaging, and cosmetics. Slack wax is the crude wax produced by chilling and solvent filter-pressing wax distillate. There are basically three types of slack wax produced, the type depending on the viscosity of the lube oil being dewaxed: low neutral, medium neutral, and heavy neutral.

In one aspect, the petroleum wax has a melting point less than or equal to about 77° C. (170° F.). In some aspects, the petroleum wax has a melting point greater than or equal to about 46° C. (115° F.). In another aspect, the petroleum wax has a melting point of about 46° C. (115° F.) to about 77° C. (170° F.). In further aspects, the petroleum wax has a melting point of about 46° C., 47° C., 48° C., 49° C., 50° C., 51° C., 52° C., 53° C., 54° C., 55° C., 56° C., 57° C., 58° C., 59° C., 60° C., 61° C., 61° C., 62° C., 64° C., 65° C., 66° C., 67° C., 68° C., 69° C., 70° C., 71° C., 72° C., 73° C., 74° C., 75° C., 76° C., or 77° C., where any temperature can form a lower and upper end-point of a range.

In some aspects, the petroleum wax in the sizing agent has an oil content of less than about 30 wt %. In one aspect, the petroleum wax has an oil content of at least about 5 wt %. In another aspect, the petroleum wax has an oil content of about 5 wt % to about 30 wt %. In further aspects, the petroleum wax has an oil content of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, where any weight percent can form a lower and upper end-point of a range.

In some aspects, the petroleum wax in the sizing agent has a flash point less than about 316° C. (600° F.). Thus, in some aspects, the petroleum wax has a flash point of about 204° C. (400° F.) to about 316° C. (600° F.). Thus, in some aspects, the petroleum wax of the disclosed sizing agent has a flash point of about 204° C., 205° C., 206° C. 207° C., 208° C., 209° C., 210° C., 211° C., 212° C., 213° C., 214° C., 215° C., 216° C., 217° C., 218° C., 219° C., 220° C., 221° C., 222° C., 223° C., 224° C., 225° C., 226° C., 227° C., 228° C., 229° C., 230° C., 231° C., 232° C., 233° C., 234° C., 235° C., 236° C., 237° C., 238° C., 239° C., 240° C., 241° C., 242° C., 243° C., 244° C., 245° C., 246° C., 247° C., 248° C., 249° C., 250° C., 251° C., 252° C., 253° C., 254° C., 255° C., 256° C., 257° C., 258° C., 259° C., 260° C., 261° C., 262° C., 263° C., 264° C., 265° C., 266° C., 267° C., 268° C., 269° C., 270° C., 271° C., 272° C., 273° C., 274° C., 275° C., 276° C., 277° C., 278° C., 279° C., 280° C., 281° C., 282° C., 283° C., 284° C., 285° C., 286° C., 287° C., 288° C., 289° C., 290° C., 300° C., 301° C., 302° C., 303° C., 304° C., 305° C., 306° C., 307° C., 308° C., 309° C., 310° C., 311° C., 312° C., 313° C., 314° C., 315° C., or 316° C., where any temperature can form a lower and upper end-point of a range. Press temperatures in OSB are typically around 221° C. (430° F.). Therefore, a wax or sizing agent is desired with a flash point above that temperature to reduce fire hazards. Thus, as one of skill in the art would appreciate, it is preferred that for safety reasons that the flash point of the final sizing agent be greater than about 232° C. (450° F.).

In some aspects, the petroleum wax of the disclosed sizing agent has a melting point less than about 77° C. (170° F.), an oil content of about 5 wt % to about 30 wt %, and a flash point less than about 316° C. (600° F.) COC (i.e., determined by Cleveland Open Cup).

In some aspects, the petroleum wax of the disclosed sizing agent comprises a blend of two or more petroleum waxes, such as the petroleum waxes disclosed herein. It is understood that the skilled artisan can identify and produce blends of petroleum waxes that would have the same physical properties of those waxes disclosed herein and could, therefore, be used as substitutes for the waxes disclosed herein.

In one aspect, the sizing agent disclosed herein comprises a blend of soy wax and a slack wax. For example, a sizing agent disclosed herein comprises a blend of soy wax and SW137 petroleum wax (petroleum slack wax from Holly Corporation of Dallas, Tex. with a typical melting point of 58.3° C., 232.2° C. flash point COC (i.e., determined by Cleveland Open Cup), 18 wt % average oil content) at about a 20:80, 25:75, 30:70, 35:65, 40:60, 45:55, 50:50, 55:45, 60:40, 65:35, 70:30, 75:25, or 80:20 weight blend ratio. Thus, the sizing agent can comprise 20 wt % soy and 80 wt % SW137; 30 wt % soy and 70 wt % SW137; 40 wt % soy and 60 wt % SW137; 50 wt % soy and 50 wt % SW137; 60 wt % soy and 40 wt % SW137; 70 wt % soy and 30 wt % SW137; or 80 wt % soy and 20 wt % SW137.

Thus, in another example embodiment, the sizing agent disclosed herein comprises a blend of soy wax and KENDEX® Heavy Neutral (HN) wax at about a 20:80, 25:75, 30:70, 35:65, 40:60, 45:55, 50:50, 55:45, 60:40, 65:35, 70:30, 75:25, or 80:20 blend weight ratio. Thus, the sizing agent can comprise 20 wt % soy and 80 wt % HN; 30 wt % soy and 70 wt % HN; 40 wt % soy and 60 wt % HN; 50 wt % soy and 50 wt % HN; 60 wt % soy and 40 wt % HN; 70 wt % soy and 30 wt % HN; or 80 wt % soy and 20 wt % HN. Based on similar characteristics, other examples of petroleum waxes could include 700SW and SC-7319 from Calumet Refining, or waxes from the 400 series from IGI (The International Group, Inc.).

In another example embodiment, the sizing agent disclosed herein comprises a blend of soy wax and INDRAWAX® 120E (petroleum slack wax from Industrial Raw Materials Corp. of New York, N.Y., with a typical 47.8° C. melting point, 204.4° C. flash point COC, 18 wt % average oil content) at about a 20:80, 25:75, 30:70, 35:65, 40:60, 45:55, 50:50, 55:45, 60:40, 65:35, 70:30, 75:25, or 80:20 blend weight ratio. Thus, the sizing agent can comprise 20 wt % soy and 80 wt % INDRAWAX® 120E; 30 wt % soy and 70 wt % INDRAWAX® 120E; 40 wt % soy and 60 wt % INDRAWAX® 120E; 50 wt % soy and 50 wt % INDRAWAX® 120E; 60 wt % soy and 40 wt % INDRAWAX® 120E; 70 wt % soy and 30 wt % INDRAWAX® 120E; or 80 wt % soy and 20 wt % INDRAWAX® 120E.

In another example embodiment, the sizing agent disclosed herein comprises a blend of tallow and SW137 petroleum wax at about a 20:80, 25:75, 30:70, 35:65, 40:60, 45:55, 50:50, 55:45, 60:40, 65:35, 70:30, 75:25, or 80:20 weight blend ratio. Thus, the sizing agent can comprise 20 wt % tallow and 80 wt % SW137; 30 wt % tallow and 70 wt % SW137; 40 wt % tallow and 60 wt % SW137; 50 wt % tallow and 50 wt % SW137; 60 wt % tallow and 40 wt % SW137; 70 wt % tallow and 30 wt % SW137; or 80 wt % tallow and 20 wt % SW137.

In another example embodiment, the sizing agent disclosed herein comprises a blend of tallow and heavy neutral (HN) wax at about a 20:80, 25:75, 30:70, 35:65, 40:60, 45:55, 50:50, 55:45, 60:40, 65:35, 70:30, 75:25, or 80:20 weight blend ratio. Thus, the sizing agent can comprise 20 wt % tallow and 80 wt % HN; 30 wt % tallow and 70 wt % HN; 40 wt % tallow and 60 wt % HN; 50 wt % tallow and 50 wt % HN; 60 wt % tallow and 40 wt % HN; 70 wt % tallow and 30 wt % HN; or 80 wt % tallow and 20 wt % HN.

In another example embodiment, the sizing agent disclosed herein comprises a blend of tallow and INDRAWAX® 120E at about a 20:80, 25:75, 30:70, 35:65, 40:60, 45:55, 50:50, 55:45, 60:40, 65:35, 70:30, 75:25, or 80:20 weight blend ratio. Thus, the sizing agent can comprise 20 wt % tallow and 80 wt % INDRAWAX® 120E; 30 wt % tallow and 70 wt % INDRAWAX® 120E; 40 wt % tallow and 60 wt % INDRAWAX® 120E; 50 wt % tallow and 50 wt % INDRAWAX® 120E; 60 wt % tallow and 40 wt % INDRAWAX® 120E; 70 wt % tallow and 30 wt % INDRAWAX® 120E; or 80 wt % tallow and 20 wt % INDRAWAX® 120E.

In another example embodiment, the sizing agent disclosed herein comprises a blend of tallow and INDRAWAX® 6643 (also know as PROWAX® 563 from Exxon Mobil of Irving, Tex.) at about a 20:80, 25:75, 30:70, 35:65, 40:60, 45:55, 50:50, 55:45, 60:40, 65:35, 70:30, 75:25, or 80:20 weight blend ratio. Thus, the sizing agent can comprise 20 wt % tallow and 80 wt % INDRAWAX® 6643; 30 wt % tallow and 70% INDRAWAX® 6643; 40 wt % tallow and 60 wt %

INDRAWAX® 6643; 50 wt % tallow and 50 wt % INDRAWAX® 6643; 60 wt % tallow and 40 wt % INDRAWAX® 6643; 70 wt % tallow and 30 wt % INDRAWAX® 6643; or 80 wt % tallow and 20 wt % INDRAWAX® 6643.

In an example embodiment, to blend the biowax and petroleum wax, each wax can be heated above its respective melting point, and the two liquefied waxes can be introduced in a mixing tank or vessel. The mixture of the two liquefied waxes can be agitated for a period of time to achieve a homogeneous product. Mixing blades or shear agitation can be used to mix both components. In-line mixing through a mixing tube can, for example, also be used to achieve the final product.

In some aspects, the herein disclosed compositions and articles further comprise additional compounds or reagents. For example, the herein disclosed compositions and articles can further comprise one or more anti-oxidants such as TBHQ, corrosion inhibitors, dyes, fungicides, insecticides, or any combination thereof.

Disclosed herein is an engineered wood composite produced with any of the sizing agents described herein. Such engineered wood composite can include, but is not limited to, oriented strand board (OSB), particle board, plywood, waferboard, chipboard, medium-density fiberboard, parallel strand lumber, oriented strand lumber (OSL), and laminated strand lumber.

Thus, the disclosed engineered wood composite can in some aspects be an oriented strand board (OSB). An exemplary OSB of the present invention comprises a plurality of layers of wood strands, flakes, chips, particles, or wafers wherein each layer of wood strands, flakes, chips, particles, or wafers includes strands oriented perpendicularly to the adjacent layers. As used herein, “flakes”, “strands”, “chips”, “particles”, and “wafers” are considered equivalent to one another and are used interchangeably. Such wood strands are bonded together by a binder resin and sized by a sizing agent disclosed herein. An exemplary OSB of the present invention includes a 1.2192 m (4 ft) by 2.4384 m (8 ft) panel.

In some aspects of the disclosed engineered wood composite, the biowax of the sizing agent is produced from hydrogenated soybean or hydrogenated castor oil. In another example, in a disclosed engineered wood composite, the biowax of the sizing agent is produced from tallow. Thus, in some aspects of the disclosed engineered wood composite, the biowax of the sizing agent is hydrogenated tallow or blends of tallow and hydrogenated tallow.

For example, in some aspects of the disclosed engineered wood composite, the petroleum wax of the sizing agent has a melting point of about 46° C. (115° F.) to about 77° C. (170° F.), an oil content of about 5 wt % to about 30 wt %, and a flash point of about 204° C. (400° F.) to about 316° C. (600° F.).

Disclosed herein is a method of manufacturing an engineered wood composite comprising coating a plurality of wood strands with a binder resin and a sizing agent disclosed herein; assembling the coated strands into a mat; and curing the coated strands in the mat to form the wood composite.

Engineered wood composites prepared according to the present invention can be made from a variety of different lignocellulosic materials, such as wood, including naturally occurring hardwood or softwood species, singularly or mixed, and grasses such as bamboo. Strands of lignocellulosic materials are cut, dried, and then coated with one or more polymeric thermosetting binder resins, waxes, and other additives. Typical binder concentrations are in the range of about 1.5 wt % to about 20 wt %. Various polymeric resins, preferably thermosetting resins, can be employed as binder resins for the wood flakes or strands. The binder resin can be pMDI (liquid polymeric diphenylmethane diisocyanate). The binder resin can be a powder phenolic resin, or the binder resin can be a liquid phenolic or amino based resin. Suitable polymeric binders include isocyanate resin, urea-formaldehyde (UF), phenol formaldehyde, melamine-urea-formaldehyde (MUF), melamine-formaldehyde (MF), or melamine-urea-phenol formaldehyde (MUPF), and the co-polymers thereof. A suitable pMDI binder resin product is RUBINATE® 1840 available from Huntsman, Salt Lake City, Utah, and MONDUR® 541 pMDI available from Bayer Corporation, North America, of Pittsburgh, Pa. Suitable commercial MUF binders are the LS 2358 and LS 2250 products from Dynea Corporation, Helsinki, Finland. The ratio of binder to sizing agent (based on weight) can be about 50:50, 55:45, 60:40, 65:35, 70:30, 75:25, or 80:20.

The binder resin, sizing agent described herein, and the other various additives that are applied to the wood materials are referred to herein as a coating, even though the binder, sizing agent, and additives may be in the form of small particles, such as atomized particles or solid particles, which do not form a continuous coating upon the wood material. The binder, sizing agent, and any other additives are applied to the wood materials by one or more spraying, blending or mixing techniques. A preferred technique is to spray a mixture of the sizing agent, binder and other additives on the wood strands as the strands are tumbled in a drum blender. In one example, the sizing agent can be added through a j-nozzle at a temperature that is typically between about 140° F. to about 210° F. (~60-99° C.) depending on the melt point of the sizing agent (i.e., the sizing agent is added at temperature above its melting point). In one aspect, the loading level of the sizing agent is in the range of about 0.5 to about 2.5 wt %. In other aspects, the binder and sizing agent can be applied sequentially to the wood strands.

The sizing agents described herein provide numerous advantages, including enhancing the resistance of the OSB panels to moisture penetration, providing unexpected synergism, and lowering costs. If the bio-based or the petroleum-based wax products are used separately in an engineered composite wood panel, the panel would have higher panel swelling as compared to an engineered wood composite panel using the sizing agent of the present invention. In other words, due to the synergy between the blend of a bio-based wax with that of a petroleum-based wax, engineered wood composites (such as OSB panels) made with a wax blend of the present invention have a lesser tendency to swell than those made with conventional slack wax or with the biowax alone. Characteristics intermediate those of the biowax and the slack wax was expected.

Engineered wood composites produced with sizing agents herein can be used to produce a variety of articles. For example, the composites can be used as sheathing to form a floor, roof or wall or in furniture, to name a few.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Evaluation of Petroleum Wax Substitutes in OSB

Experimental Procedures:

Two boxes of surface and core southern Yellow Pine flakes were used to make prototype wood composite panels (oriented strand board (OSB)). The "surface flakes" were the flakes used in the surface layers of the panel, while the "core flakes" were the flakes used in the core layer of the panel. The surface flakes were larger in dimension than the core flakes. The surface flakes were at approximately 9% moisture content (MC) and the core flakes were about 3% MC. The flakes were processed in a blender (Coil Manufacturing Ltd.) where liquid polymeric diphenylmethane diisocyanate (MONDUR® 541 from Bayer Corporation, North America, of Pittsburgh, Pa.) was applied to the flakes through an atomizer disk at a rotation speed of 10,500 RPM. Resin loading was 4% on a dry panel weight basis. A sizing agent corresponding to a treatment from Table 1 was also selected and then applied into the blender at the prescribed loading using a j-nozzle under pressure (30 psi).

TABLE 1

Sizing Agent and Loading Conditions

| Treatment | Description | % NVS loading[2] |
|---|---|---|
| INDRAWAX ® 6643[1] | Control slack wax | 2.0 |
| INDRAWAX ® 6643 | Control slack wax | 1.0 |
| No wax | | 0.0 |
| 88-583-1[3] | Hydrogenated soybean oil wax | 2.0 |
| CENWAX ® G[4] | Hydrogenated castor oil wax | 2.0 |
| 88-583-1 | Hydrogenated soybean oil wax | 1.0 |
| CENWAX ® G | Hydrogenated castor oil wax | 1.0 |
| INDRAWAX ® 6643 | Control slack wax | 2.0 |
| INDRAWAX ® 6643 | Control slack wax | 1.0 |
| No wax | | 0.0 |

[1]Distributed by Industrial Raw Materials Corporation of New York, NY (hereinafter referred to "Industrial Raw Materials"). Product is manufactured by ExxonMobil as PROWAX ® 563.

[2]% weight of the additive (NVS or "non-volatile solids") per weight of dry fiber.

[3]From Archer Daniels Midland Company of Decatur, IL (hereinafter referred to as "ADM").

[4]From Arizona Chemical Company of Jacksonville, FL (hereinafter referred to as "Arizona").

Flakes were then tumbled for 2-3 minutes before being formed into a flake mat. Flakes were oriented randomly in successive layer (surface, core, surface) to achieve a 65 wt % ratio surface to 35 wt % core ratio. Note that flakes are typically oriented at 90° angle between face and core layer. Random orientation speeds up the board manufacturing process in a laboratory setting. Mats were pressed in a Dieffenbacher press at 210° C. (410° F.) under the conditions in Table 2.

TABLE 2

Panel Manufacturing Conditions 23/32"

| | | |
|---|---|---|
| Panel density: | 41 | lbs/ft$^3$ |
| Press time: | 150 | sec |
| Target thickness: | 0.715 | inch |
| Panel size: | 34 × 34 | inch |
| Cook time: | 150 | sec |
| Close: | 20-30 | sec |
| Degas: | 20-30 | sec |
| % MDI surface: | 4 | |
| % MDI core: | 4 | |
| % MC face: | 7-9 | |
| % MC core: | 3-5 | |
| # panels/condition: | 2 | |
| # samples/panel: | 2 | |

Two panels were pressed for each condition. Panels were placed in a stack for 5 days. Prior to sample cutting, a three inch trim was cut on each side of the panel to remove low density areas. Two samples measuring 15.24 cm (6 in.) by 15.24 cm (6 in.) each were then cut from each panel for a total of 4 samples for each experimental condition. An additional set of two panels was also pressed for the control condition (INDRAWAX® 6643, 2% NVS loading) to validate experimental variation throughout the study.

Samples were then weighed and measured before and after a 24-hour soak period. ASTM D1037-06 was used for the testing protocol. Testing included edge swell measurement as well. Edge swell measurement is not included in ASTM 1037, but the same procedures were followed on the edge. Testing was carried under 2.54 cm (1 in.) of water in a temperature controlled 20° C. (68° F.) water bath. Sample thickness was measured along the middle of each edge and also within 2.54 cm (1 in.) of each side. Thickness measurements were done using a MITUTOYO® micrometer. A detail measurement diagram is provided in FIG. 1, showing where edge swell and thickness swell were measured.

Figure 2:
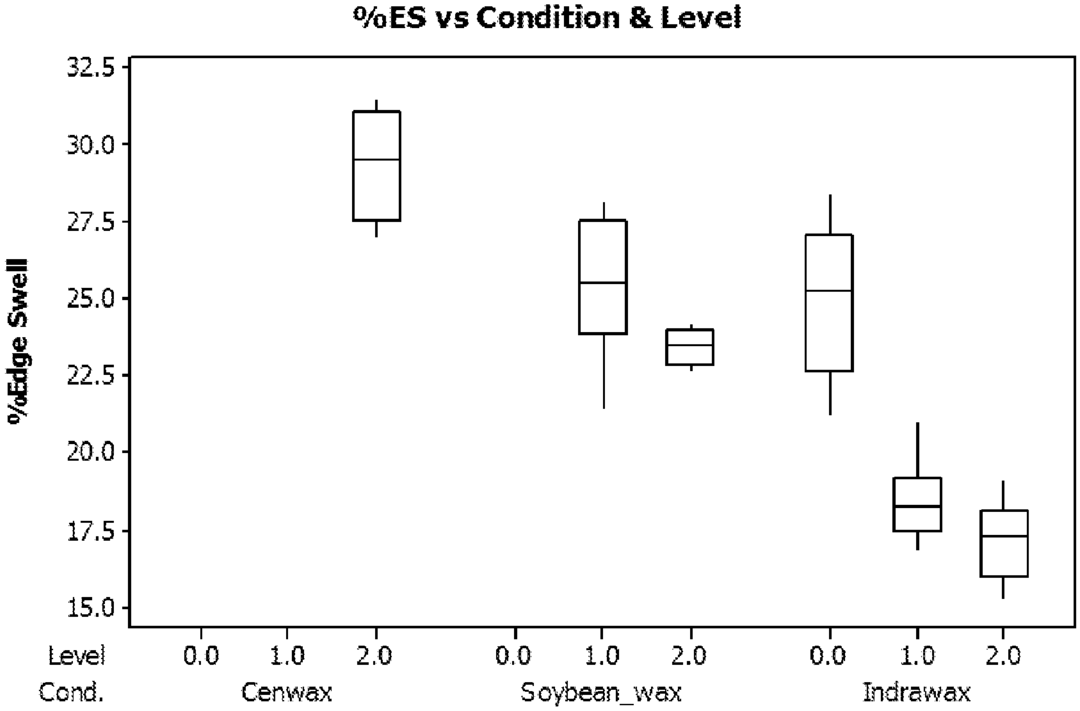
FIG. 2 is a box plot diagram showing edge swell (ES) results for natural waxes and control slack wax.
Figure 3:
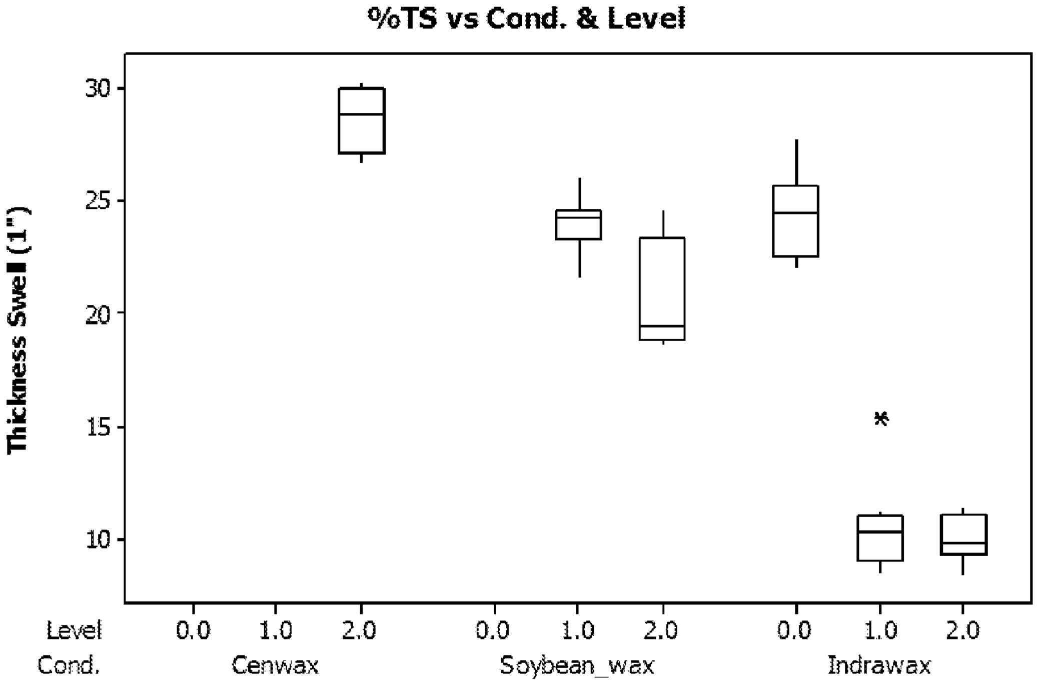
FIG. 3 is a box plot diagram showing thickness swell (TS) results for natural waxes and control slack wax.

Results:

FIG. 2 is a box plot diagram showing edge swell (ES) results for the natural waxes and control slack wax sizing agents shown in Table 1. FIG. 3 is a box plot diagram showing thickness swell (TS) results for the natural waxes and the control slack wax. According to FIGS. 2 and 3, bio-based waxes alone perform worse than the control. Edge and thickness swell measurements were statistically higher than those of the control product (INDRAWAX® 6643). A slight improvement in performance was observed when soybean wax level was increased from 1 to 2%. However, during flake blending, soybean wax balls were found on the flakes at the 2% level.

Example 2

Performance of Bio-Based Petroleum Wax Blends (Study 2)

The goals of the study were to identify a suitable petroleum wax which would improve the performance of bio-based wax products in a blend form and to benchmark the performance of tallow as a wax replacement. Wax blends were also tested for properties such as flash point, melt point, and oil content to verify the potential viability of the wax formulations for use in engineered wood composites.

Experimental Procedures:

Bio-based waxes were blended at a 50-50 wt % ratio with various petroleum waxes. For a description of the wax blends and the different grades of wax, refer to Tables 3 and 4 below. Blending was performed after the different types of wax were melted in a hot oven at 82° C. (180° F.). After the waxes were melted, the different types waxes were poured into a glass jar and weighed to achieve the desired blend ratio (50-50 wt %). Wax blends were homogenized by shaking the glass jar for one minute. To evaluate the water repellency of the different wax blends/grades described in Table 3, the experimental procedures from Example 1 were followed.

TABLE 3

| Condition Description | | |
|---|---|---|
| Conditions | Treatment | % NVS loading |
| 1 | INDRAWAX ® 6643 | 2% |
| 2 | CENWAX ®/NV120 | 1-1% |
| 3 | CENWAX ®/SW137 | 1-1% |
| 4 | CENWAX ®/IGI411 | 1-1% |
| 5 | Soy/IGI411 | 1-1% |
| 6 | Soy/NV120 | 1-1% |
| 7 | Soy/SW137 | 1-1% |
| 8 | Tallow1 | 2% |
| 9 | Tallow1/6643 | 1-1% |
| 10 | Tallow1/IGI411 | 1-1% |
| 11 | Tallow1/NV120 | 1-1% |
| 12 | Tallow1/SW137 | 1-1% |
| 13 | Tallow2 | 2% |
| 14 | Tallow2/6643 | 1-1% |
| 15 | Tallow2/NV120 | 1-1% |
| 16 | Tallow2/SW137 | 1-1% |

TABLE 4

| Wax Description (measured or as provided by the suppliers) | | | | | |
|---|---|---|---|---|---|
| Wax | Description | Melt point | Congeal point[7] | Flash point COC[8] | Oil Content %[9] |
| Soy wax (ADM) | Hydrogenated Soybean oil 88-583-1 | 131-136° F.[5] (55-57.8° C.) | 103° F. (39.4° C.) | 540° F. min (282.2° C.) | na |
| CENWAX ® ME (Arizona) | Hydrogenated castor oil | 124° F.[5] (51.1° C.) | na | ~480° F. (248.9° C.) | na |
| Tallow1 (South Chicago Packing)[1] | Hydrogenated tallow SCP110 | 108° F.[10] (42.2° C.) | na | 600° F. min (315.6° C.) | na |
| Tallow2 (South Chicago Packing) | Hydrogenated tallow SCP135 | 133-137° F.[10] (56.1-58.3° C.) | 108° F. (42.2° C.) | 600° F. min (315.6° C.) | na |
| INDRAWAX ® 6643[2] (Industrial Raw Materials) | Petroleum wax | 150° F.[6] (65.6° C.) | 140-155° F. (60-68.3° C.) | 450° F. min (232.2° C.) | 11% typical (20% max) |
| INDRAWAX ® 120E (Industrial Raw Materials) | Petroleum wax | 118° F.[6] (47.8° C.) | na | 400° F. min (204.4° C.) | 18% extractables |
| SW137 (Holly)[3] | Petroleum wax | 137° F.[6] (58.3° C.) | 120-138° F. (48.9-58.9° C.) | 450° F. min (232.2° C.) | 18% typical (20% max) |
| IGI 411A (IGI)[4] | Petroleum wax | 150-167° F.[6] (65.6-75° C.) | na | 535° F. min (279.4° C.) | 15% typical (12-18%) |

Figure 4:
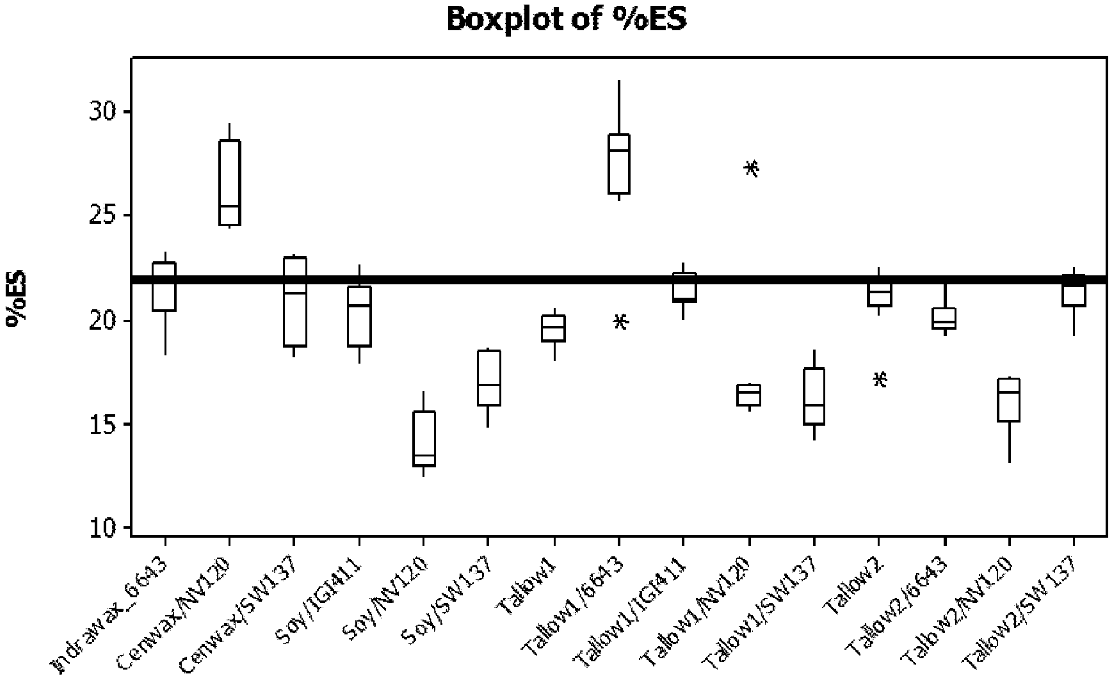
FIG. 4 is a box plot diagram showing edge swell results for petroleum and bio-based wax blends.
Figure 5:
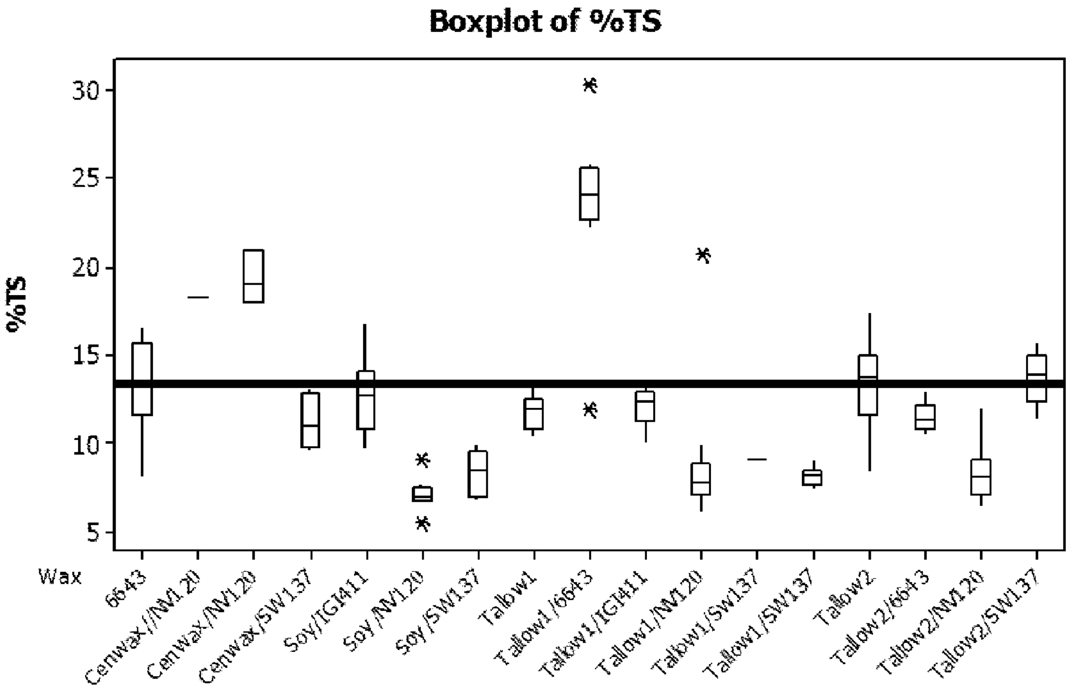
FIG. 5 is a box plot diagram showing thickness swell results for petroleum and bio-based wax blends.
Figure 6:
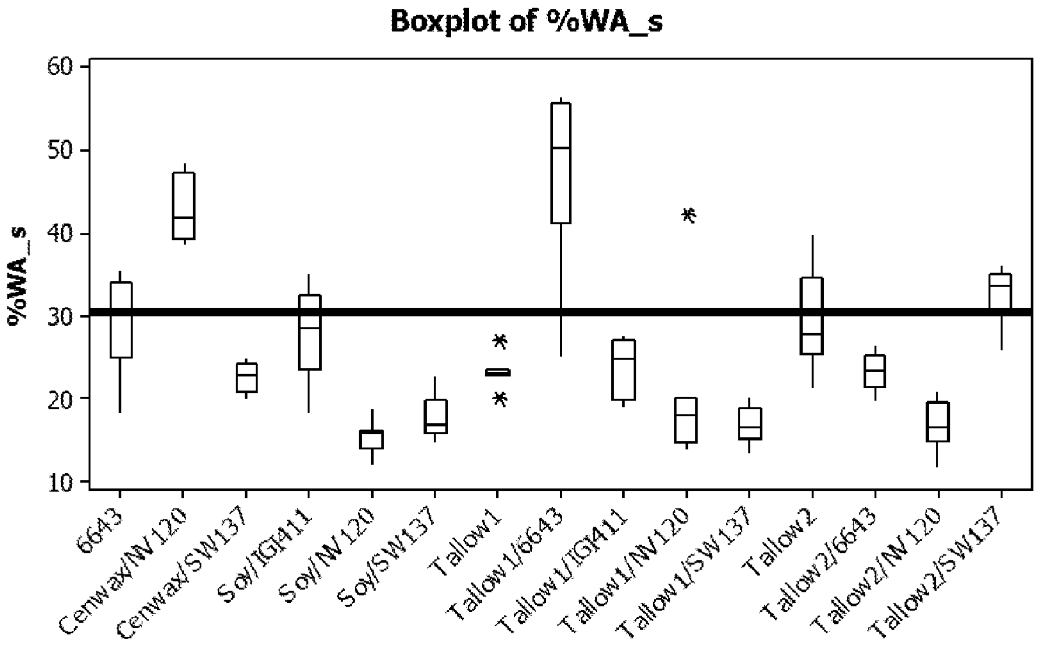
FIG. 6 is a box plot diagram showing water absorption (WA) results for petroleum and bio-based wax blends.

[1]South Chicago Packing Company of Homewood, IL
[2]INDRAWAX ® 6643, which is also referred as 6643, is the industry standard or control treatment.
[3]Holly Corporation, Dallas, TX
[4]The International Group, Inc. of Titusville, PA.
[5]As determined using the AOCS Cc18-80 testing protocol
[6]As determined using the ASTM D87-09 testing protocol
[7]As determined using the ASTM D938-04 testing protocol
[8]As determined using the ASTM D92-05 testing protocol (in an open container)
[9]As determined using the ASTM D721-06 testing protocol
[10]As determined using the AOCS Cc2-38 testing protocol Results:

FIG. 4 is a box plot diagram showing edge swell results for the petroleum and bio-based wax blends of Table 3. FIG. 5 is a box plot diagram showing thickness swell results for the petroleum and bio-based wax blends of Table 3. FIG. 6 is a box plot diagram showing water absorption (WA) results for the petroleum and bio-based wax blends of Table 3.

Tallow, in contrast to soybean- or castor-based waxes, was found to be a suitable stand alone bio-based wax. A noticeable improvement in performance was also observed when slack wax was added to tallow waxes (FIG. 4). Specifically, Tallow1 was improved with the addition of NV120 or SW137, while Tallow2 was improved with the addition of NV120. The difference was statistically different. Results show that the combination of petroleum wax with soybean or castor based wax met or exceeded the swell properties of the control panel. As shown in FIG. 3, the use of soybean wax or CENWAX® wax alone results in far greater swelling than the control. Likewise, as shown in FIG. 4, the addition of petroleum waxes provides performance synergy that allows an improvement in performance that surpasses the performance of individual wax components.

The study also indicated that the wax performance was dependant on the selection of the petroleum wax for the blend. In general, characteristics such as low melt point, high oil content, and low flash point, which are found in SW137 or NV120 (see Table 4), appear to provide the greatest improvement. Based on this study, a blend of bio-based and petroleum waxes was found to be a suitable replacement for INDRAWAX® 6643.

Since handling characteristics are as important as performance for use in engineered wood composites, some analytical testing was carried out to determine wax properties (see Table 5). A higher melting point tallow (Tallow2) was chosen to reduce potential product oxidation and reduce potential wax bleeding at low temperature. Flash point and melt point were also measured on several blends to verify potential for fire hazards. The use of NV120 was found to be somewhat problematic for its flash point, but this concern could be mitigated by increasing the blend ratio of bio-based to petroleum wax to meet the desired minimum standards of 450° F.

TABLE 5

| Wax Characteristics | | | | | | |
|---|---|---|---|---|---|---|
| | Wax Blends (blend ratio) | | | | | |
| Properties | NV120/ Soy wax (1:1) | NV120/ Tallow2 (1:1) | SW137/ Soy wax (1:1) | SW137/ Tallow2 (1:1) | NV120/ Tallow1[1] (2:3) | NV120/ Tallow1[1] (3:7) |
| Flash Point ASTM D-92-05 | 455° F. (235° C.) | 445° F. (229.4° C.) | 495° F. (257.2° C.) | 490° F. (254.4° C.) | 450° F. (232.2° C.) | 470° F. (243.3° C.) |
| Oil content[2] ASTM D-721-06 | 11.4 | 11.4 | 9.0 | 9.0 | 9.1 | 6.8 |
| Melt point ASTM D-3954-94 (2004) | 119.2° F. (48.4° C.) | 123.3° F. (50.7° C.) | 125.0° F. (51.7° C.) | 125.6° F. (52° C.) | 126.7° F. (52.6° C.) | 128.5° F. (53.6° C.) |

[1]Blends were tested to verify effect on flash point but not tested for performance.
[2]Since there is no oil in bio-based waxes, the oil content of the mixture wax calculated based on the contribution of the petroleum based wax. The oil content of the petroleum wax was provided by the supplier.

From the laboratory study, it appeared that tallow could be used as a wax substitute for water repellency. When the SW137 was blended with tallow or soy, a drop in melt point was observed. This drop in the melt point was unexpected. Individually, each component (namely the SW137 and the tallow or soy) has a melt point that is superior (or higher than) the melt point of the blended wax. The lower melt point of the blend helps improve wax processing through the application system in case of downtime and is also believed to improve the flow of the wax on the surface of the panel during hot pressing. With a lower melt point, the wax takes more time to cool down from its liquid form to its "congealed" form in the event of a line stoppage. This time helps the manufacturing plant start the line back-up without having to deal with solid wax residues in the equipment, as residues can plug spray equipment. Also, by having a lower melt point, the wax has a longer time to flow and penetrate the wood fibers of the wood composite material.

Example 3

Wax Blends Refinement and Results Confirmation

The main goal of this study was to confirm the results of Example 2. Other goals included verifying the performance when changing from a 50-50 wt % to a 40-60 wt % bio-wax to petroleum blend ratio. Other goals included testing an alternative petroleum wax to SW137 for blending purposes. The alternative product was KENDEX® Heavy Neutral (HN) wax from American Refining Group Inc. of Bradford, Pa.

Experimental Procedures:

Using the experimental procedures described in Example 2, the performance of the wax blends shown in Table 6 was verified.

TABLE 6

| Wax Description, Study 3. | | |
|---|---|---|
| Condition | Wax. | % NVS Loading |
| 1 | Control-6643 | 2 |
| 2 | 40 wt % soy - 60 wt % SW137 | 2 |
| 3 | 50 wt % soy - 50 wt % SW137 | 2 |
| 4 | 60 wt % Tallow - 40 wt % SW137 | 2 |
| 5 | 40 wt % Tallow - 60 wt % SW137 | 2 |
| 6 | 60 wt % Tallow - 40 wt % HN | 2 |
| 7 | 40 wt % Tallow - 60 wt % HN | 2 |
| 8 | Tallow (135° F.) | 2 |

Figure 7:
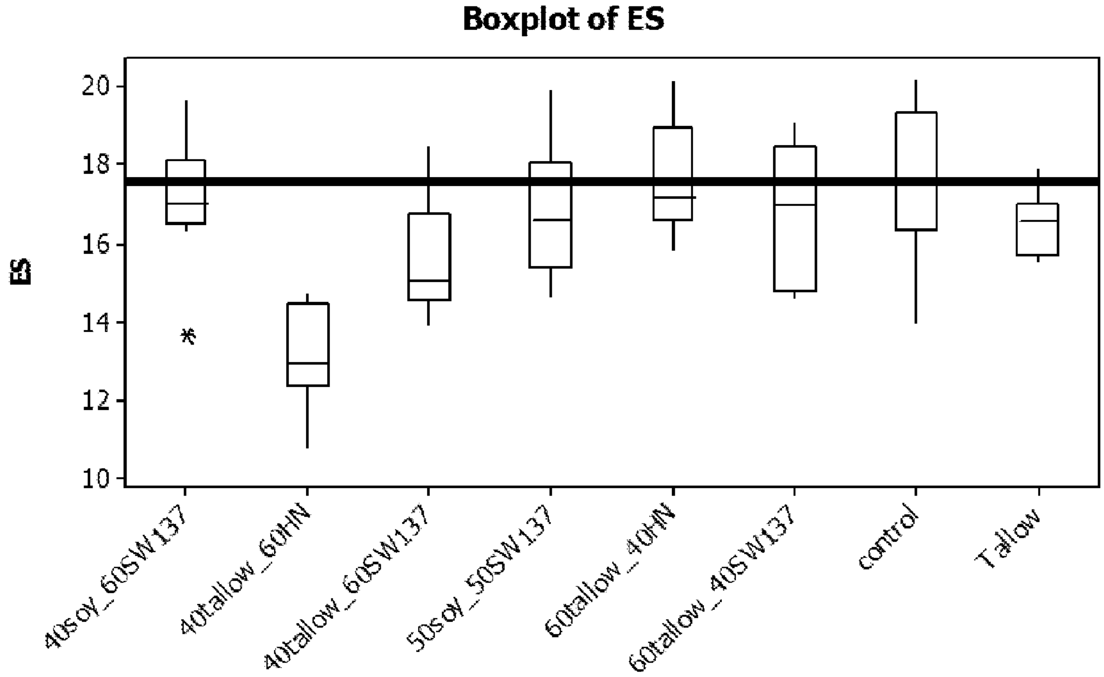
FIG. 7 is a box plot diagram showing edge swell results for blends of petroleum and bio-based waxes according to example embodiments of the present invention.
Figure 8:
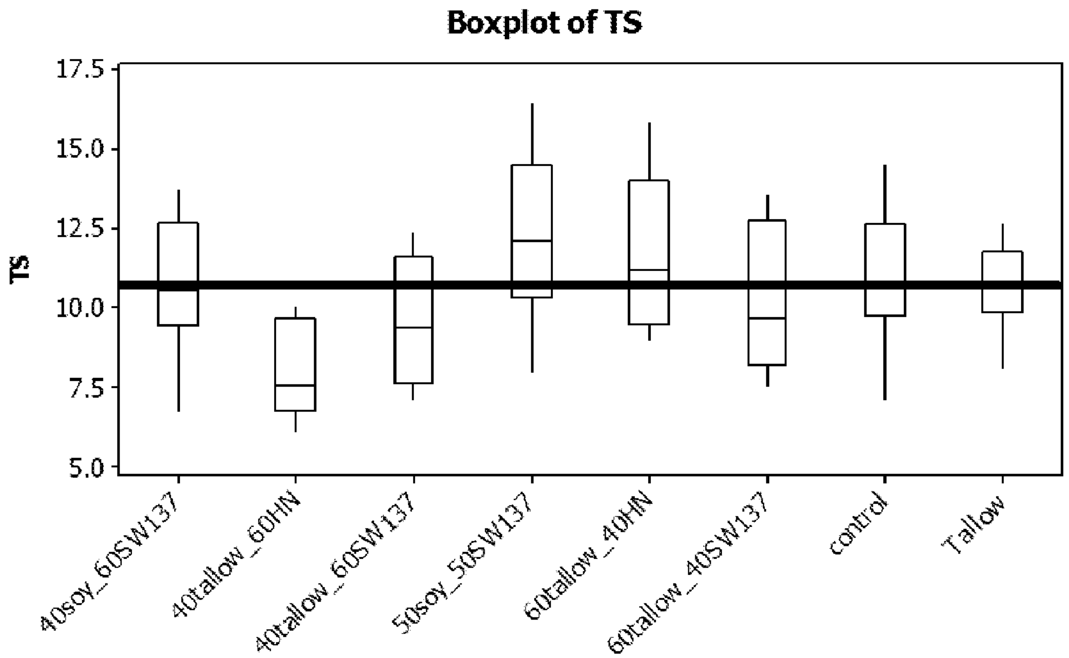
FIG. 8 is a box plot diagram showing thickness swell results for blends of petroleum and bio-based waxes according to example embodiments of the present invention.
Figure 9:
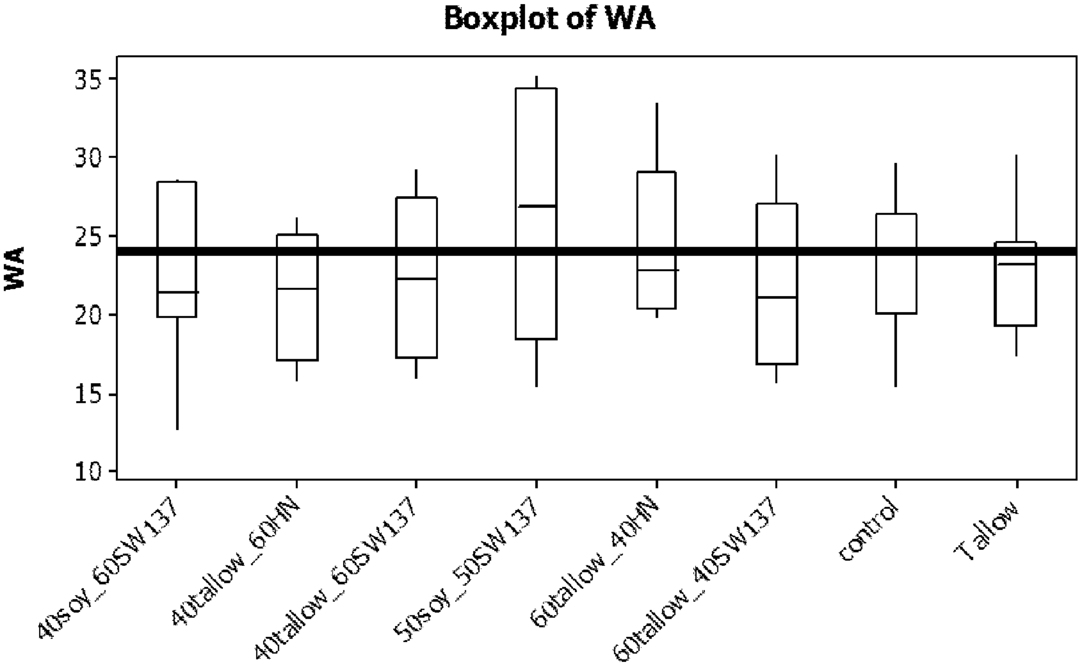
FIG. 9 is a box plot diagram showing water absorption results for blends of petroleum and bio-based waxes according to example embodiments of the present invention.

Results:

FIG. 7 is a box plot diagram showing the edge swell results for petroleum and bio-based wax blends in Example 3. The labeling of the wax refers to the percentage of the first component and the percentage of the second component. For example, "40soy_60SW137" is defined as 40 wt % soy wax and 60 wt % SW137 slack wax. FIG. 8 is a box plot diagram showing thickness swell results for petroleum and bio-based wax blends in Example 3. FIG. 9 is a box plot diagram showing water absorption results for petroleum and bio-based wax blends in Example 3. Results from this study confirm the previous findings that blended bio-based and petroleum wax are superior or comparable to control wax (INDRAWAX® 6643) for water repellency. Depending on blends, they are statistically better on edge swell (such as 40tallow_60HN or 40tallow_60SW137) or the same (other blends). As with the previous study, it was confirmed that tallow can be used as a stand alone water repellent. Without blending with petroleum waxes, soy waxes are inferior in performance to controls and are, thus, inadequate for use. Results also show that the KENDEX® Heavy Neutral (HN) product to be equivalent to SW137 for blending purposes and could be used as a substitute.

Example 4

Wax Blends Optimization Study

The goal of this study was to bracket the performance change of various ratios of bio-based wax to petroleum slack wax. Soy was selected as the bio-based wax for this study due to previous results that showed that it had to be blended with a petroleum wax in order to provide any performance benefits.

Experimental Procedures:

Using the experimental procedures described in the Example 2, the performance of the following wax and wax blends (described in Table 7) was verified. The study was conducted in two separate parts since due to ventilation system problems in the lab.

TABLE 7

| Wax Description | | | |
|---|---|---|---|
| Condition | Wax | Wax Loading (%) | Part |
| 1 | 6643 | 2 | 1 |
| 2 | NV120 | 2 | 1 |
| 3 | SW137 | 2 | 1 |
| 5 | SW137 (30 wt %)/soy (70 wt %) | 2 | 1 |
| 6 | SW137 (50 wt %)/soy (50 wt %) | 2 | 1 |
| 7 | SW137 (70 wt %)/soy (30 wt %) | 2 | 1 |
| 8 | NV-120 (30 wt %)/soy (70 wt %) | 2 | 1 |
| 9 | NV-120 (50 wt %)/soy (50 wt %) | 2 | 1 |
| 10 | NV-120 (70 wt %)/soy (30 wt %) | 2 | 1 |
| 11 | 6643 (30 wt %)/soy (70 wt %) | 2 | 2 |
| 12 | 6643 (50 wt %)/soy (50 wt %) | 2 | 2 |
| 13 | 6643 (70 wt %)/soy (30 wt %) | 2 | 2 |
| 14 | 6643 | 2 | 2 |

Figure 10:
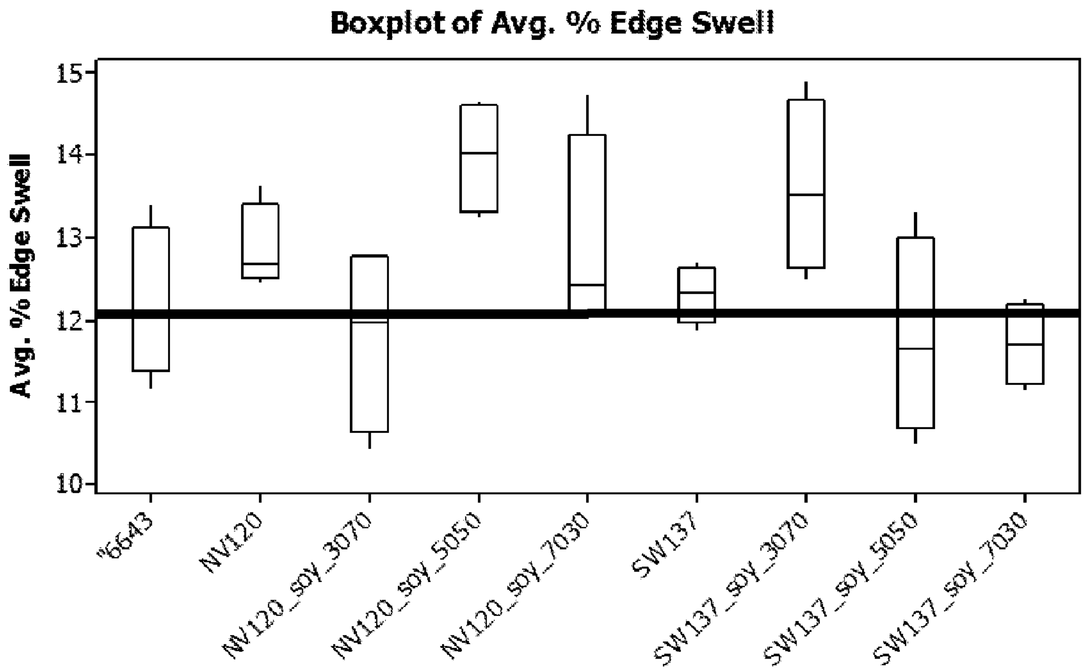
FIG. 10 is a box plot diagram showing edge swell results for petroleum and soy wax blends according to example embodiments of the present invention.
Figure 11:
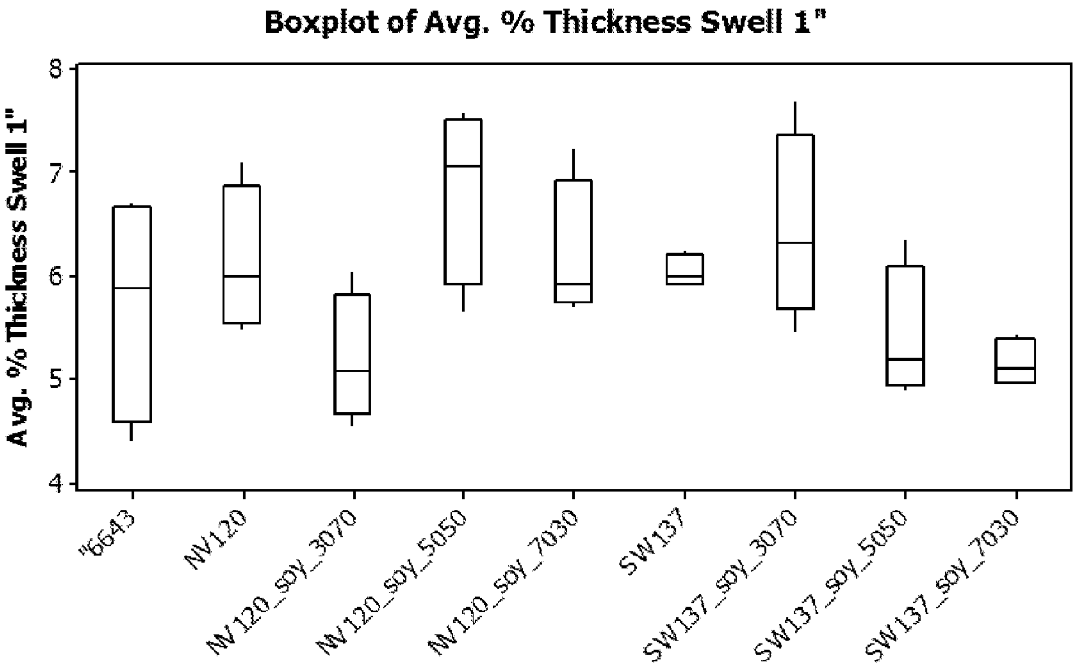
FIG. 11 is a box plot diagram showing thickness swell results for petroleum and soy wax blends according to example embodiments of the present invention.
Figure 12:
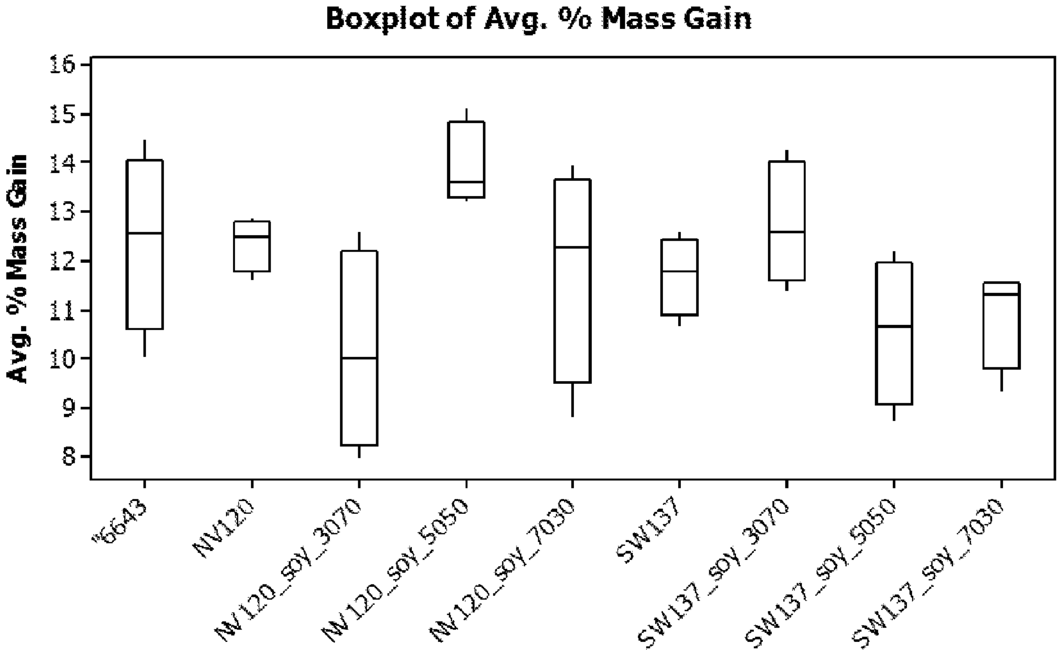
FIG. 12 is a box plot diagram showing water absorption results for petroleum and soy wax blends according to example embodiments of the present invention.
Figure 13:
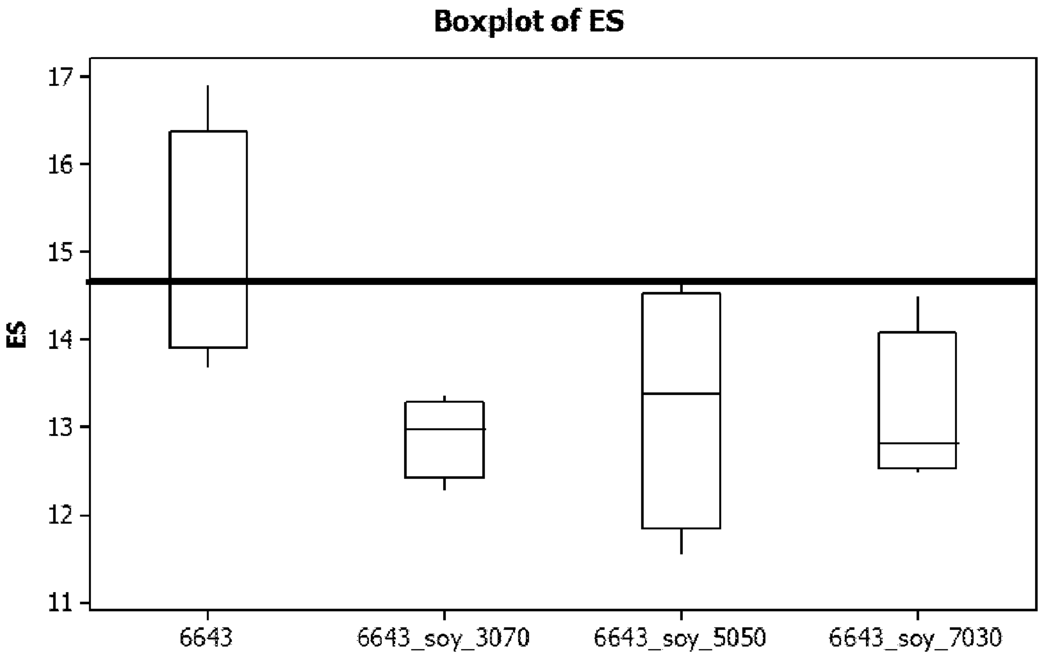
FIG. 13 is a box plot diagram showing edge swell results for petroleum and soy wax blends according to example embodiments of the present invention.
Figure 14:
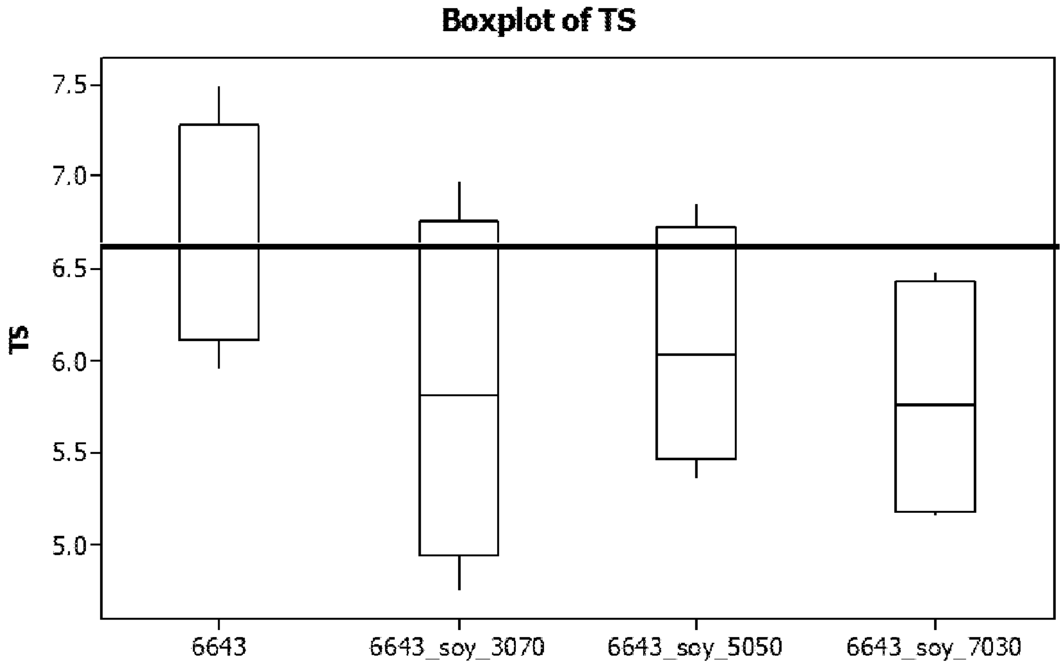
FIG. 14 is a box plot diagram showing thickness swell results for petroleum and soy wax blends according to example embodiments of the present invention.
Figure 15:
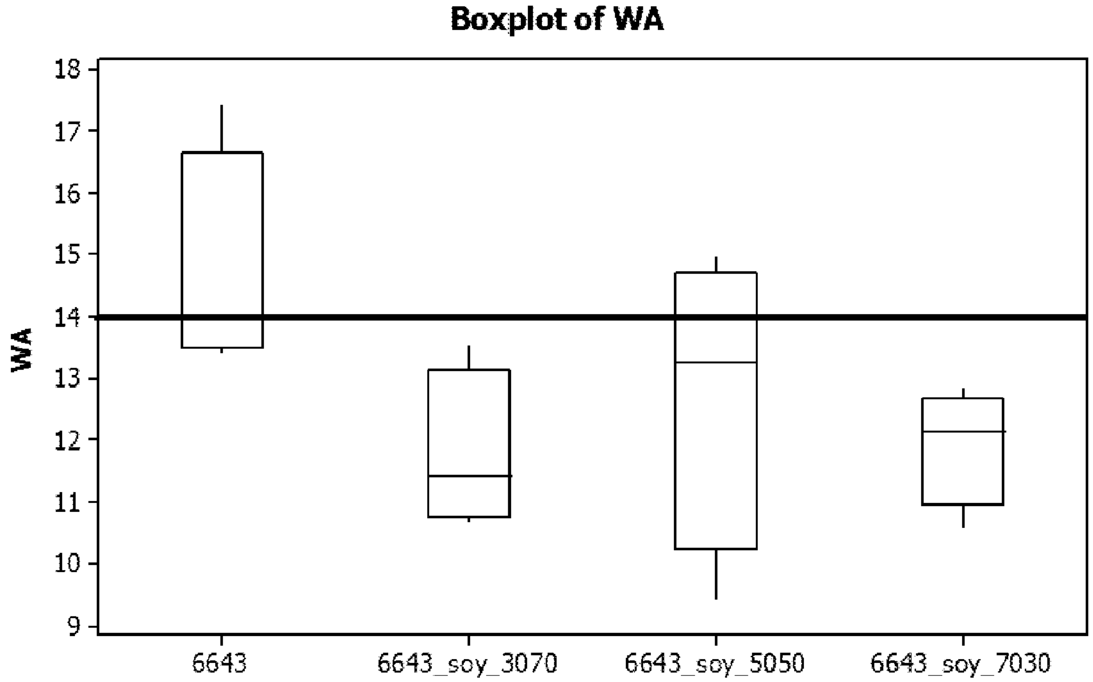
FIG. 15 is a box plot diagram showing water absorption results for petroleum and soy wax blends according to example embodiments of the present invention.

Results:

FIGS. 10 and 13 are box plot diagrams showing edge swell results for petroleum and soy wax blends in Example 4. FIGS. 11 and 14 are box plot diagrams showing thickness swell results for petroleum and soy wax blends in Example 4. FIGS. 12 and 15 are box plot diagram showing water absorption results for petroleum and soy wax blends in Example 4. Results demonstrated that changing the ratio of soy wax to petroleum wax had little impact on performance. The amount of soy wax in the formulation can be bracketed anywhere from about 30 wt % to about 70 wt % with the resulting blend performance being at least comparable to the control petroleum wax. The swell performance of the different petroleum wax products was improved when soy based wax was blended with them.

Example 5

Plant Trial Using Soybean Wax Blend with SW137

Due to the variable nature of making laboratory panels, plant trials were run to verify the concept of blending bio-based wax with petroleum wax for use as a sizing agent. Among the criteria that were considered for the selection of the different blends for plant trials were offered product availability, suitable flash point and oil content, and price competitive when compared to the control wax.

The goal of this study was to verify if the tallow wax blend could meet or exceed performance of the control wax in a plant setting.

Experimental Procedures:

Soybean wax (ADM product #88-583-1 with a melt point of 135° F.) and petroleum wax (SW137 from Holly) were acquired for a trial at the Huber Engineered Woods LLC plant located in Crystal Hill, Va. The waxes were blended at a 50-50 wt % ratio in a mixing vessel using a low shear agitator (this wax blend is referred to herein as DC 600) and was incorporated into an OSB panel (namely the 23/32" ADVANTECH® flooring (which is 1.825 cm thick)) according to conventional techniques. The DC 600 blend was run in 23/32" ADVANTECH® flooring manufacturing for a period of four hours until a load (unit) of panels could be isolated. Five panels were sampled from the unit for testing. Two samples were then cut from each panel and tested for swell properties after a cool down period of 72 hours. Testing was carried out using the same conditions and methods as described in Example 1.

Figure 16:
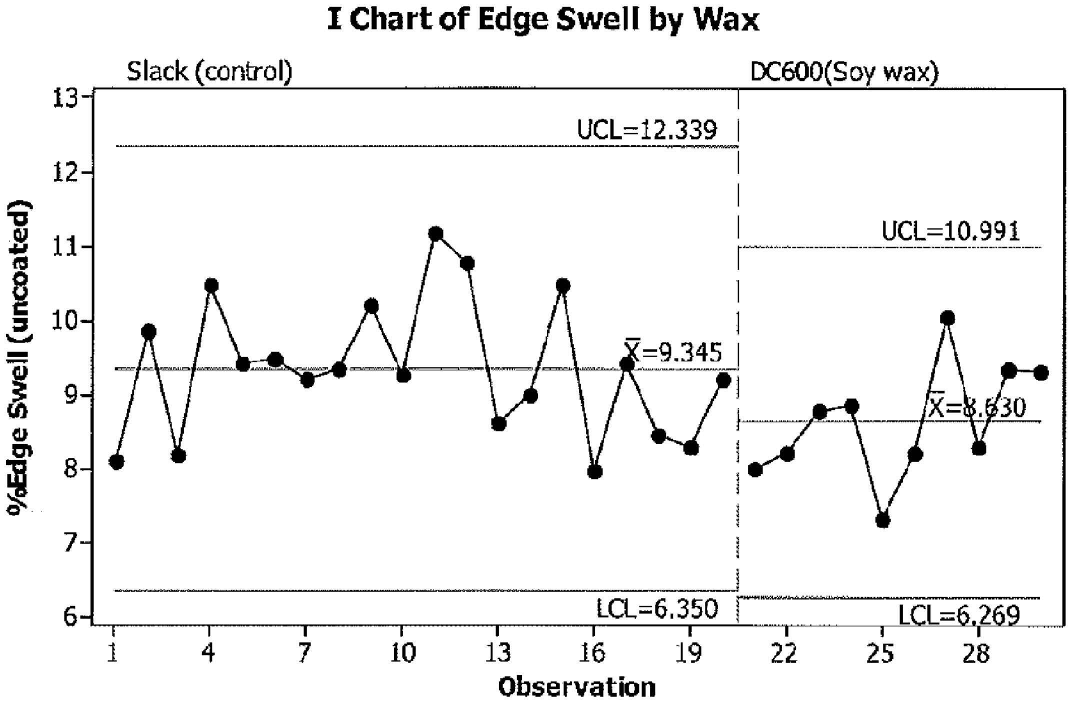
FIG. 16 shows edge swell results for soy wax blend trial after a cool down period of 72 hours according to example embodiments of the present invention.
Figure 17:
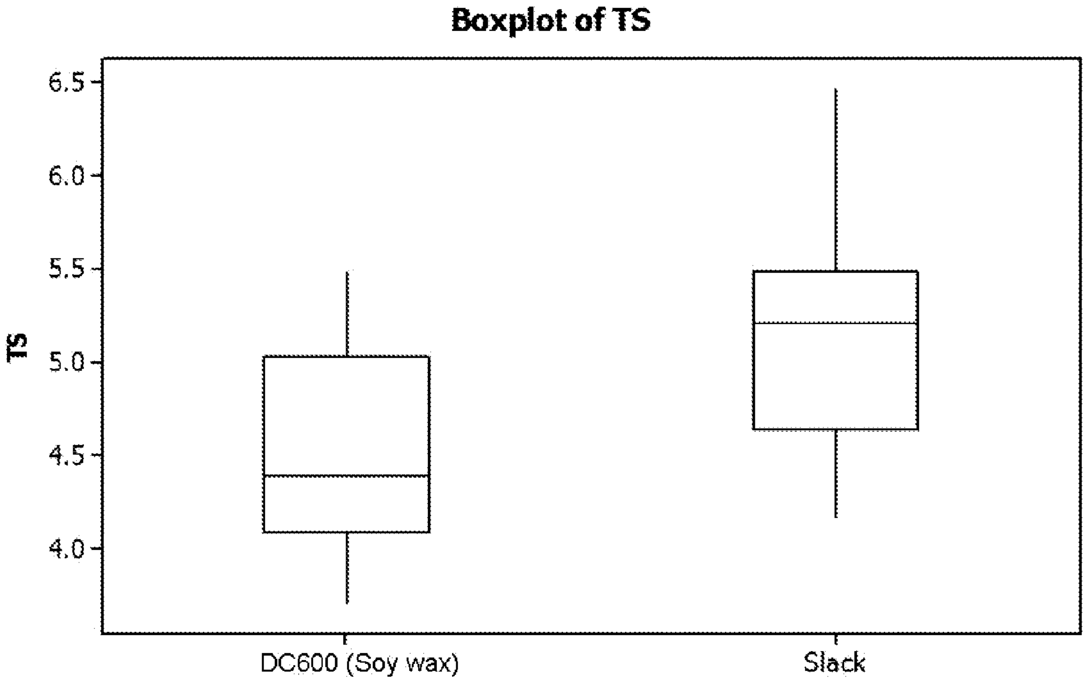
FIG. 17 is a box plot diagram showing cold thickness swell results for soy wax blend trial after a cool down period of 72 hours according to example embodiments of the present invention.
Figure 18:
FIG. 18 is a box plot diagram showing water absorption results for soy wax blend trial after a cool down period of 72 hours according to example embodiments of the present invention.

Results:

FIG. 16 shows the cold edge swell results for Example 5. FIG. 17 shows cold thickness swell results for Example 5. FIG. 18 shows water absorption results for Example 5. A t-test was also carried out to verify any statistical differences on edge swell between DC 600 (soy wax blend) and the control wax. The difference was statistically significant at a 96% confidence interval for edge swell and 99% confidence for thickness swell. As to the water absorption, no statistical differences could be found between the control and the DC 600 blend product.

Example 6

Plant Trial Using Tallow Wax Blend with SW137

The goal of this study was to verify if the tallow wax blend could meet or exceed performance of the control wax in a plant setting.

Experimental Procedures:

Tallow wax (SCP135 from South Chicago Packing with a melt point of 135° F.) and a petroleum wax (SW137 from Holly) were acquired for a trial at the Huber Engineered Woods LLC plant in Crystal Hill, Va. The waxes were blended at a 50-50 wt % ratio in a mixing vessel using a low shear agitator (wax blend is referred to herein as DC 700). The wax was loaded into an empty wax tank on the normal plant production line and was incorporated into an OSB panel (namely the 23/32" ADVANTECH® flooring) according to conventional techniques. The DC 700 blend was run in 23/32" ADVANTECH® flooring product for a period of four hours until a unit of panels could be isolated. Six panels were sampled from the unit for testing. Two samples were then cut from each panel and then tested for swell properties after a period of 72 hours. Testing was carried out following the same conditions and methods as described in Example 1.

Figure 19:
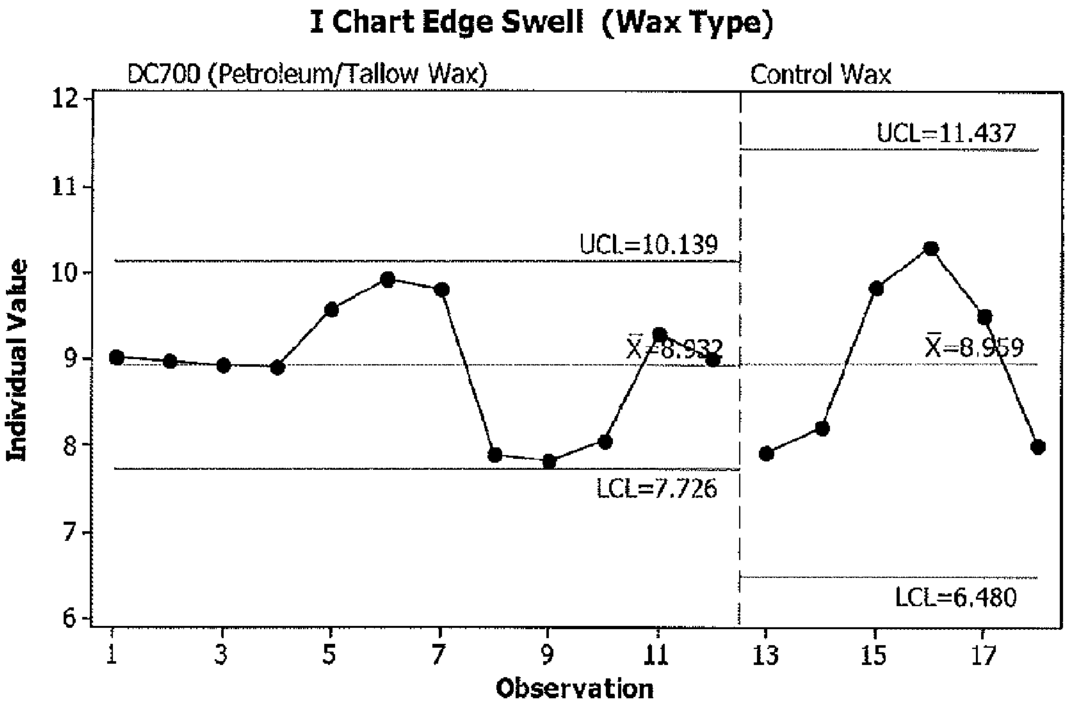
FIG. 19 shows edge swell results for tallow wax blend trial after a cool down period of 72 hours according to example embodiments of the present invention.

Results:

Edge swell results show that the experimental tallow blend and control waxes are performing essentially equally. Similar trends on thickness swell and water absorption were also observed (FIG. 19).

Example 7

Extended Plant Trial Using Tallow Wax Blend with SW137 (DC 700)

The goal of this study was to verify the performance of the DC 700 tallow blend used in Example 6 for an extended trial (two days) to verify the performance of the product in a plant environment subject to natural process variations.

Experimental Procedures:

For quality assurance, one 15.24 cm (6 in.) by 15.24 cm (6 in.) sample was pulled every four hours from a manufactured panel and was examined for thickness swell, edge swell, and water absorption after a cool down period of 72 hours. Testing was carried out as described in Example 1.

Figure 20:
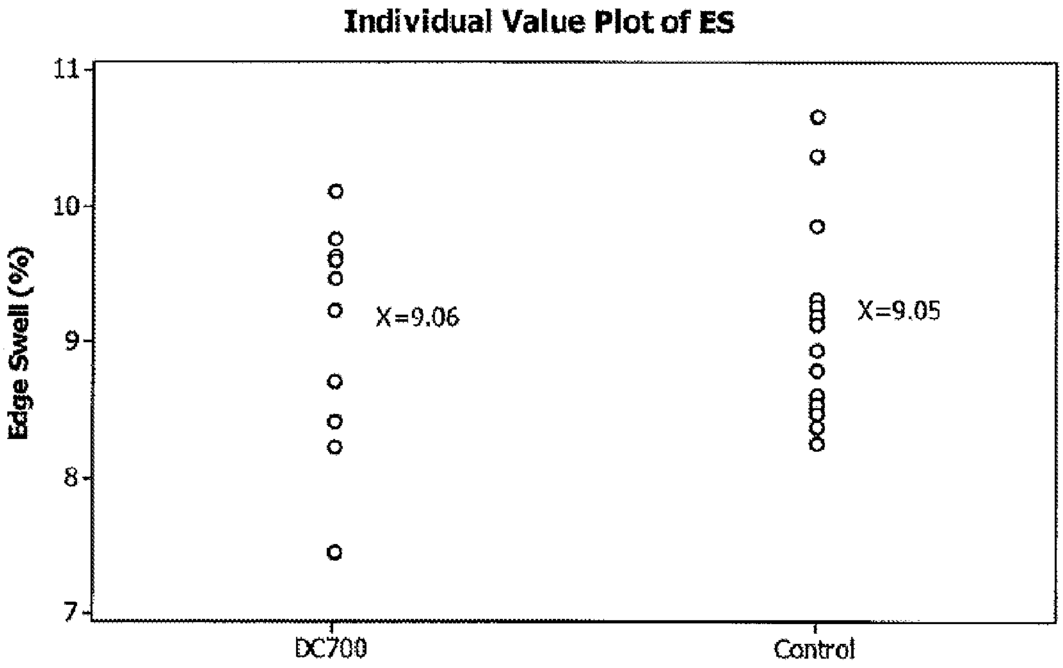
FIG. 20 shows extended edge swell results for tallow wax blend trial after a cool down period of 72 hours according to example embodiments of the present invention.
Figure 21:
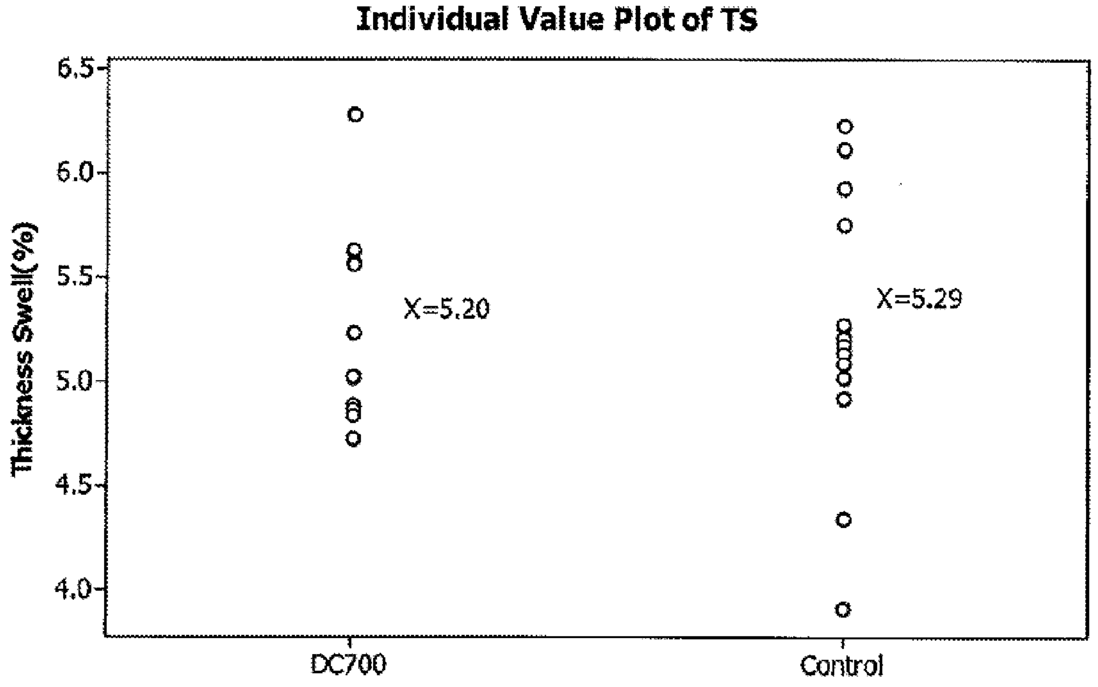
FIG. 21 shows thickness swell results for tallow wax blend trial after a cool down period of 72 hours according to example embodiments of the present invention.
Figure 22:
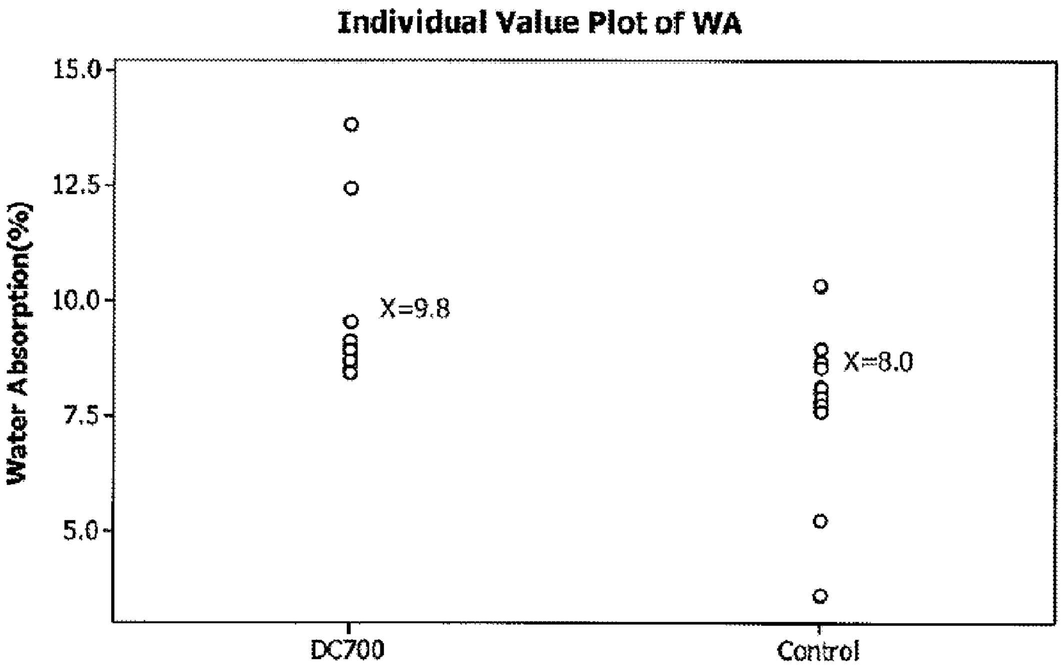
FIG. 22 shows water absorption results for tallow wax blend trial after a cool down period of 72 hours according to example embodiments of the present invention.

Results:

FIG. 20 shows edge swell results for Example 7. FIG. 21 shows thickness swell results for Example 7. FIG. 22 shows water absorption results for Example 7. No statistical differences were observed between the DC 700 blend and the control wax with respect to edge swell, thickness swell, and water absorption.

Example 8

Long Term Performance of Bio-Based Wax and Petroleum Wax Blends in Exterior Conditions The goal of this study was to evaluate the impact of outdoor exposure on the performance of panels having bio-based and petroleum wax blends.

Figure 23:
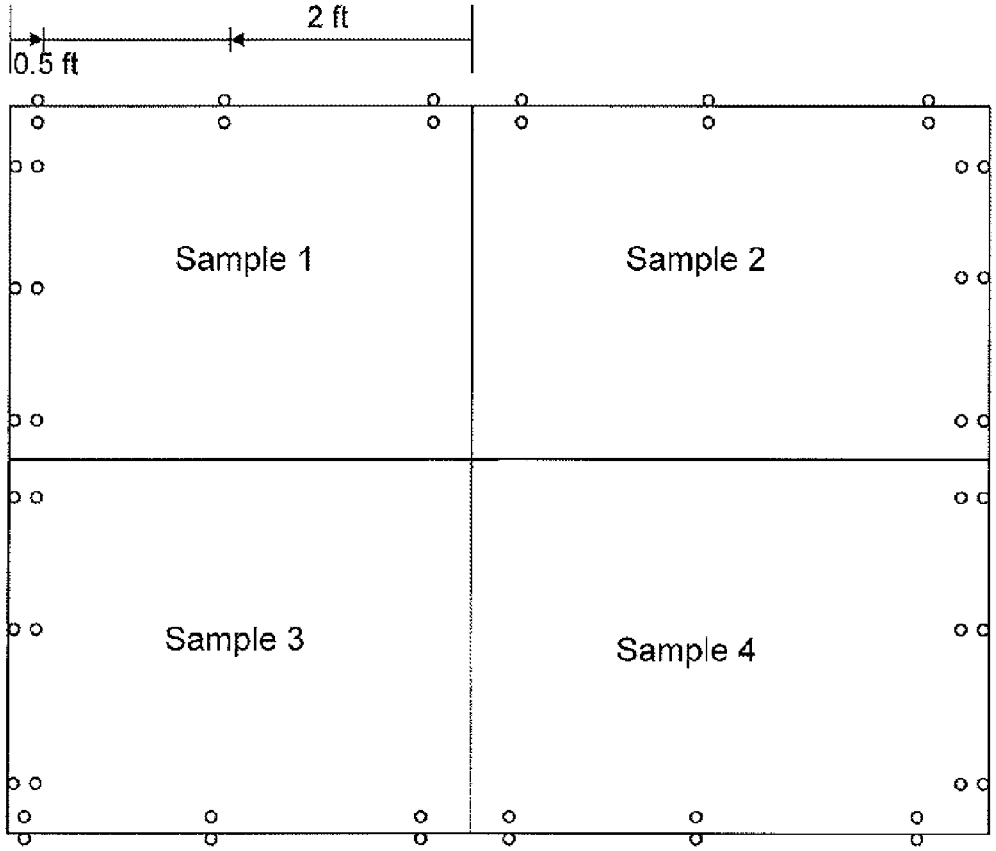
FIG. 23 shows a pictorial diagram for how to measure outdoor exposure of a 1.2192 m (4 ft) by 2.4384 m (8 ft) panel composite wood panel having bio-based and petroleum wax blends according to example embodiments of the present invention.

Experimental Procedures:

Three 4'×8' panels were pulled from the each of soy and the tallow blend trials and set aside along with three control panels for testing. Panels were cut in two 4'×4' sections. Half of the panel was kept for further testing while the other half was kept for the long term deck exposure test. Samples for long term exterior testing were measured for edge thickness and for thickness within 2.54 cm (1 in.) of the edge prior to installation. A diagram of the location of sample measurements is given in FIG. 23. Samples were installed with coated screws in a random fashion on an 8'×8' lumber joist frame. Thickness and edge swell measurement locations were marked on the panels with a permanent marker and then monitored for changes over time.

Figure 24:
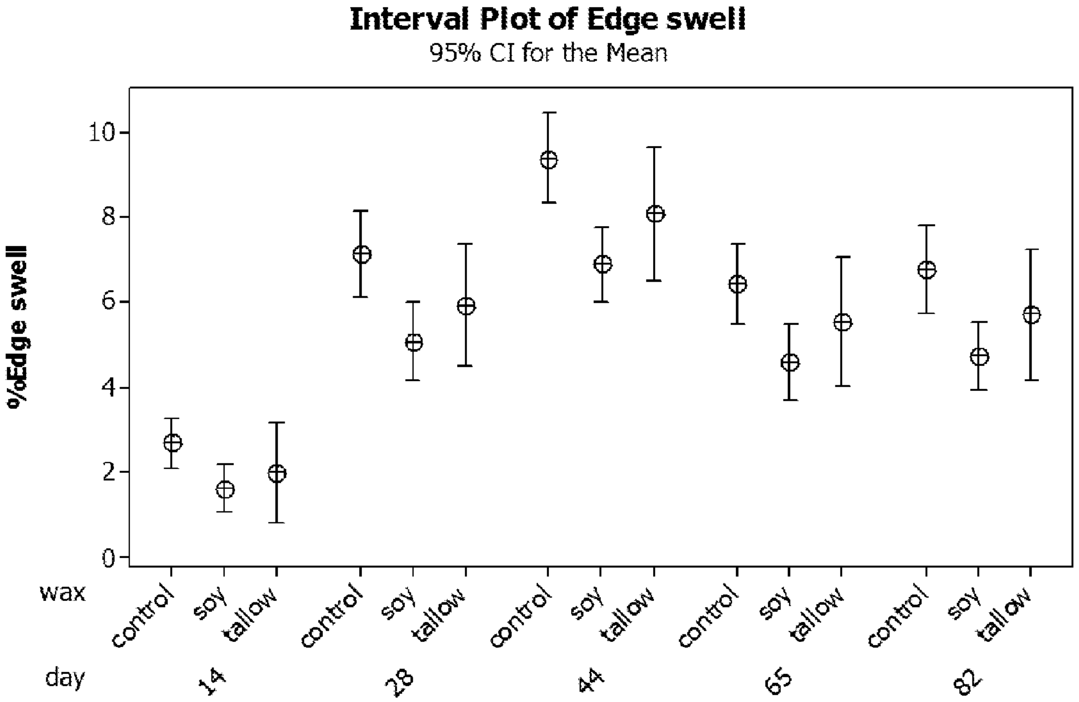
FIG. 24 is an interval plot diagram showing edge swell results for outdoor deck evaluation of bio-wax blends over time according to example embodiments of the present invention.
Figure 25:
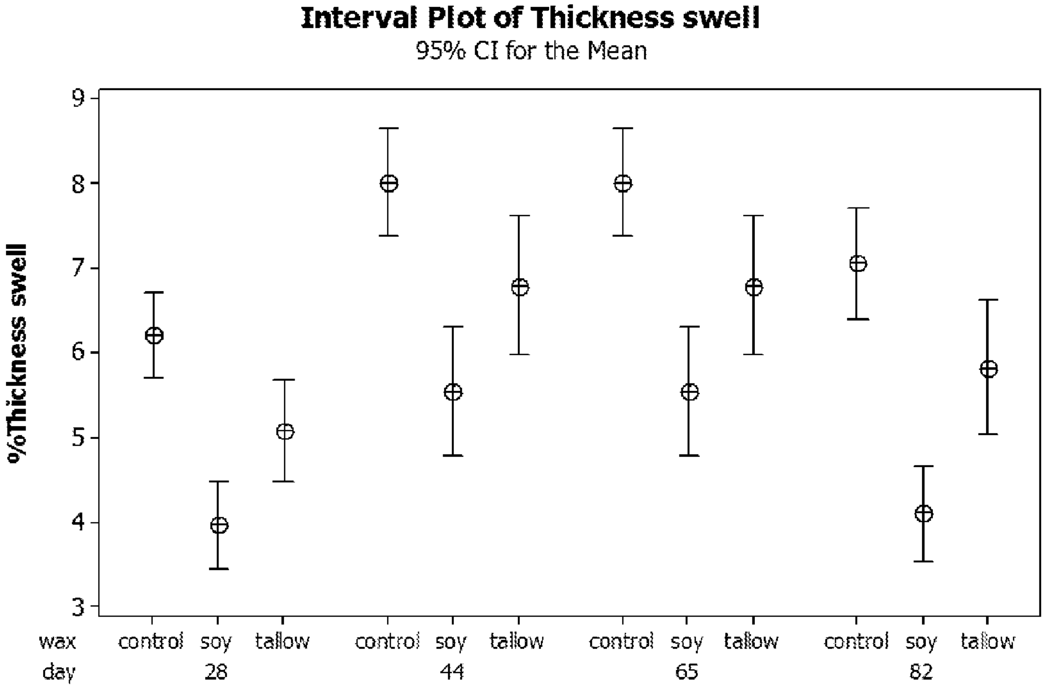
FIG. 25 is an interval plot diagram showing thickness swell results for outdoor deck evaluation of bio-wax blends over time according to example embodiments of the present invention.

Results:

Results shown FIGS. 24 and 25 indicate the bio-wax blends performed well in long term exposure. Edge and thickness swell measurements were statistically better than control panels. The improved field performance of the bio-wax blends was attributed to synergy between the two waxes. Panels were also examined for presence of mold and flake tracking which is a defect that reflects marginal bonding after outdoor exposure. No flake tracking or mold were observed.

Example 9

Alternative Source of Soy Wax

The goal of this study was to confirm the prior results with a soy wax from another supplier. For this study, the soy wax was the partially hydrogenated soybean oil LP416 from Golden Brand (Louisville, Ky.) with a melting point of 130-135° F. and a flash point above 600° F.

Figure 26:
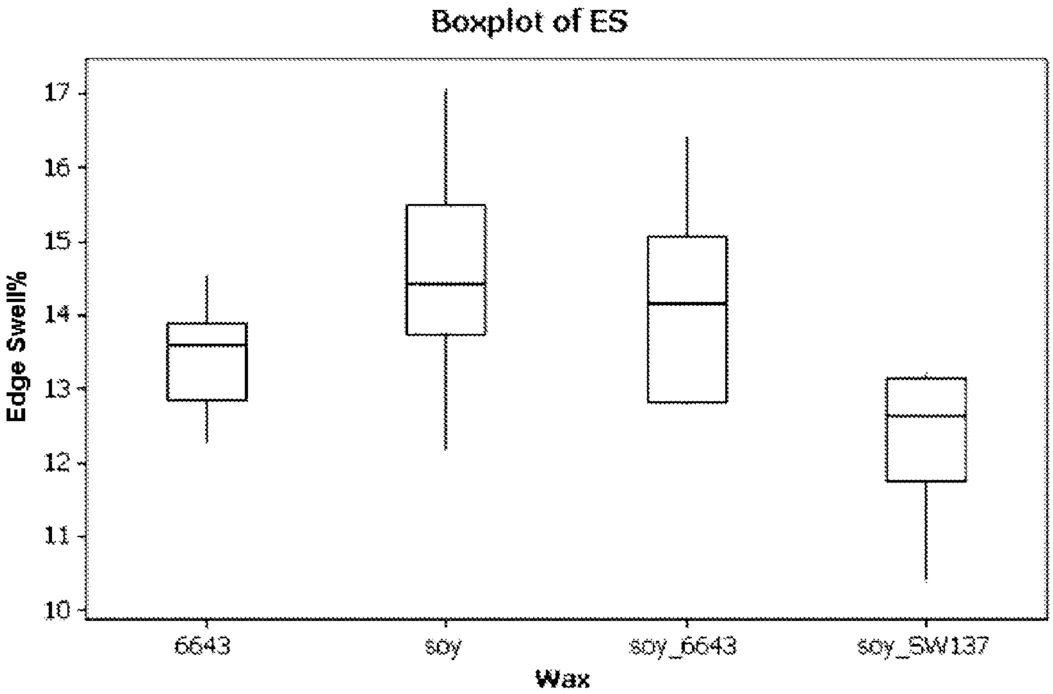
FIG. 26 is a box plot diagram showing edge swell results for petroleum and soy wax blends according to example embodiments of the present invention.
Figure 27:
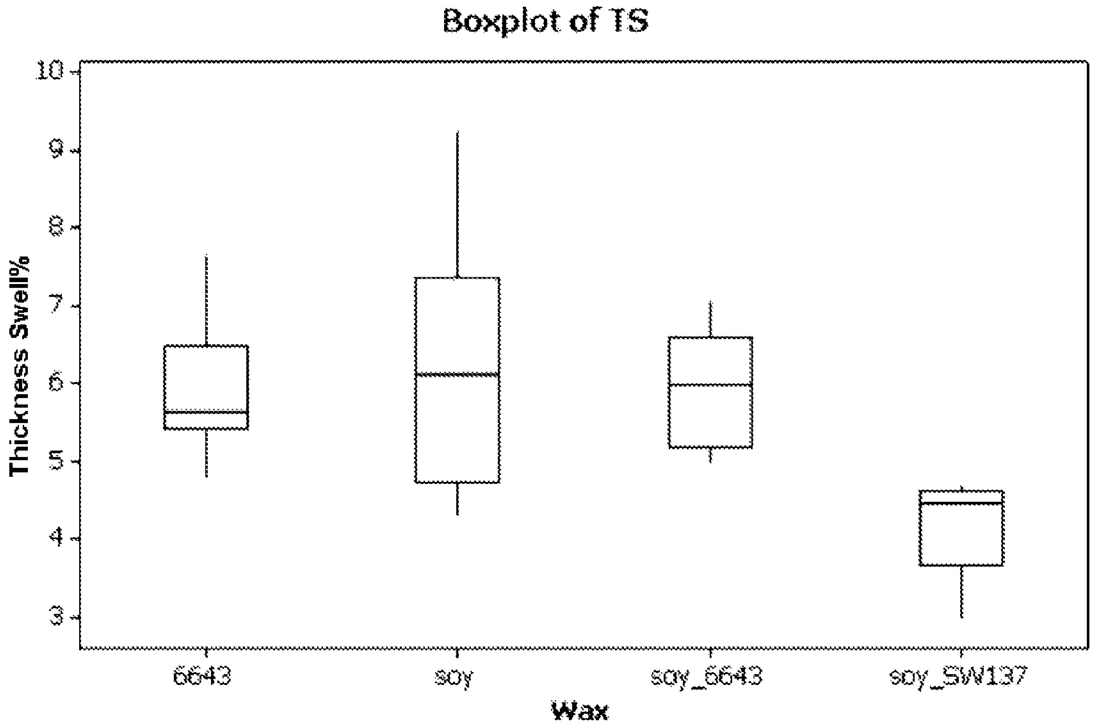
FIG. 27 is a box plot diagram showing thickness swell results for petroleum and soy wax blends according to example embodiments of the present invention.
Figure 28:
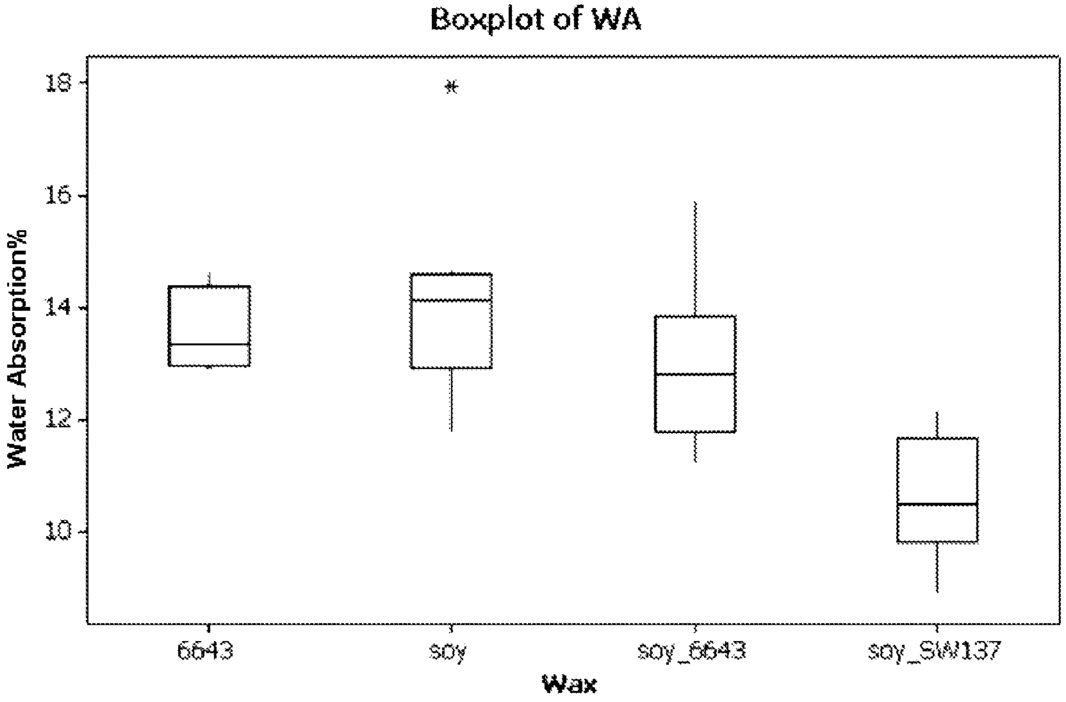
FIG. 28 is a box plot diagram showing water absorption results for petroleum and soy wax blends according to example embodiments of the present invention.

FIG. 26 shows edge swell results from Example 9. FIG. 27 shows thickness swell results from Example 9. FIG. 28 shows water absorption results from Example 9. All blends were in a 50-50 wt % ratio with SW137. Results from this study confirmed the previous findings that blended bio-based and petroleum wax were superior to control wax (INDRAWAX® 6643) for water repellency in OSB panels.

The herein disclosed blends of bio-based and petroleum-based wax provide unexpected synergism. If the bio-based or the petroleum-based wax products are used separately in an engineered composite wood panel, the panel would have higher panel swelling as compared to an engineered wood composite panel using a sizing agent of the present invention. In other words, due to the synergy between the blend of a bio-based wax with that of a petroleum-based wax, engineered wood composites (such as OSB panels) made with a wax blend of the present invention have a lesser tendency to swell than those made with a conventional slack wax or a biowax alone. See, for example, FIGS. 24 and 25. Reduction in swelling and in edge swell is important, especially for subflooring application (when engineered wood panels are installed behind flooring such as tiles, wood floor, laminates, etc.). Since panels installed in a floor application tend to “pool” water, an increase in edge swell can cause the panel to “ridge,” thereby making the joints between the panels uneven and requiring the builder to sand the floor prior to the application of the flooring. Greater amount of edge swell also increases the amount of strain applied on the nails to fasten the subfloor to the joists. Over time, this can lead to fatigue and cause a defect called “squeaking”, which is a noise caused by the nail movement.

While the invention has been described with reference to example embodiments, it will be understood by those skilled in the art that a variety of modifications, additions and deletions are within the scope of the invention, as defined by the following claims.

What is claimed is:

1. An engineered wood composite comprising at least one layer of wood flakes, wherein the wood flakes are bonded together by a binder resin and sized by a sizing agent, wherein the sizing agent comprises an effective blend of an effective ratio of a petroleum slack wax and a biowax, wherein the biowax is a wax substantially produced from a lipid derived from an animal or a plant, and wherein the petroleum slack wax has a melting point less than about 77° C. (170° F.), an oil content of about 5 wt % to about 30 wt %, and a flash point less than 316° C. (600° F.).

2. The engineered wood composite of claim 1, wherein the biowax is produced from vegetable fat or vegetable oil.

3. The engineered wood composite of claim 1, wherein the biowax comprises hydrogenated soybean, hydrogenated castor oil, or a combination thereof.

4. The engineered wood composite of claim 1, wherein the biowax comprises tallow, hydrogenated tallow, tallow blended with hydrogenated tallow, or a combination thereof.

5. The engineered wood composite of claim 1, wherein the melting of the petroleum slack wax is about 46° C. (115° F.) to about 77° C. (170° F.), wherein the oil content of the petroleum slack wax is about 5% to about 30%, and wherein the flash point of the petroleum slack wax is about 204° C. (400° F.) to about 316° C. (600° F.).

6. The engineered wood composite of claim 1, wherein the biowax and the petroleum slack wax are blended at a wt % ratio of about 20:80 to about 80:20.

7. The engineered wood composite of claim 1, wherein the biowax and the petroleum slack wax are blended at a wt % ratio of about 50:50.

8. The engineered wood composite of claim 1, wherein the engineered wood composite is an oriented strand board, particle board, plywood, waferboard, chipboard, medium-density fiberboard, parallel strand lumber, oriented strand lumber, or laminated strand lumber.

9. The engineered wood composite of claim 1, wherein the engineered wood composite is a panel.

10. The engineered wood composite of claim 1 wherein the measured edge swell is essentially equal to or less than the measured edge swell of an engineered wood composite comprising a sizing agent consisting essentially of petroleum wax.

11. An article comprising an engineered wood composite of claim 1.

12. The article of claim 11, wherein the article is a floor, wall, or roof.

13. A sizing agent composition, comprising a blend of a petroleum slack wax and a biowax, wherein the biowax is a wax substantially produced from a lipid derived from an animal or a plant, and wherein the petroleum slack wax has a melting point less than 77° C. (170° F.), an oil content of about 5% to about 30%, and a flash point less than 316° C. (600° F.).

14. The sizing agent composition of claim 13, wherein the biowax comprises hydrogenated soybean or hydrogenated castor oil.

15. The sizing agent composition of claim 13, wherein the biowax comprises tallow, hydrogenated tallow, tallow blended with hydrogenated tallow, or a combination thereof.

16. The sizing agent composition of claim 13, further comprising one or more anti-oxidants, corrosion inhibitors, dyes, fungicides, insecticides, or any combination thereof.

17. A method of manufacturing an engineered wood composite, comprising:

coating a plurality of wood flakes with a binder resin and a sizing agent, wherein the sizing agent comprises a blend of a petroleum slack wax and a biowax, wherein the biowax is a wax substantially produced from a lipid derived from an animal or a plant, and wherein the petroleum slack wax has a melting point less than 77° C. (170° F.), an oil content of about 5% to about 30%, and a flash point less than 316° C. (600° F.);

assembling the coated flakes into a mat; and curing the coated flakes in the mat to form the engineered wood composite.

18. The method of claim 17, wherein the biowax is produced from animal fat, vegetable fat, or vegetable oil.

19. The method of claim 17, wherein the biowax produced from vegetable fat, vegetable oil, hydrogenated soybean oil, hydrogenated castor oil, tallow, hydrogenated tallow, tallow blended with hydrogenated tallow, or a combination thereof.

* * * * *